United States Patent
Sarashina

(10) Patent No.: US 8,073,000 B2
(45) Date of Patent: Dec. 6, 2011

(54) CODE DIVISION MULTIPLEX SIGNAL RECEIVING APPARATUS AND CODE DIVISION MULTIPLEX TRANSMITTING AND RECEIVING SYSTEM

(75) Inventor: Masahiro Sarashina, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 396 days.

(21) Appl. No.: 12/320,483

(22) Filed: Jan. 27, 2009

(65) Prior Publication Data
US 2009/0208213 A1 Aug. 20, 2009

(30) Foreign Application Priority Data
Feb. 20, 2008 (JP) ................. 2008-038368

(51) Int. Cl.
*H04B 7/216* (2006.01)

(52) U.S. Cl. ................ 370/441; 375/145

(58) Field of Classification Search .............. 370/441
See application file for complete search history.

(56) References Cited

U.S. PATENT DOCUMENTS

| 5,539,775 A | * | 7/1996 | Tuttle et al. | 370/342 |
| 6,317,008 B1 | * | 11/2001 | Gabara | 455/260 |
| 6,356,555 B1 | * | 3/2002 | Rakib et al. | 370/441 |

FOREIGN PATENT DOCUMENTS

JP 2007-228134 9/2007

OTHER PUBLICATIONS

Ohnishi et al., 'Isanetto PON shisutem' (Ethernet PON system), Fujikura Giho, No. 102, Apr. 2002, pp. 18-21.
Ashi et al., 'PON Based All Fiber-Optic Access System for High-speed Multimedia Services', Hitachi Review, vol. 48, No. 4, 1999, pp. 229-233.

* cited by examiner

*Primary Examiner* — Chi Pham
*Assistant Examiner* — David S Andreasen
(74) *Attorney, Agent, or Firm* — Rabin & Berdo, P.C.

(57) ABSTRACT

In a code division multiplex transmitting and receiving system, the transmitting apparatus inserts a clock signal in the code division multiplex signal. The clock signal has a frequency equal to a null frequency in the frequency spectrum of the code division multiplex signal. The receiving apparatus extracts this frequency component from the received signal and recovers the clock signal, using an ordinary clock recovery device of the type designed to recover a clock signal from a bi-level signal. The recovered clock signal is used as a synchronizing signal in the processing of the received signal.

7 Claims, 16 Drawing Sheets

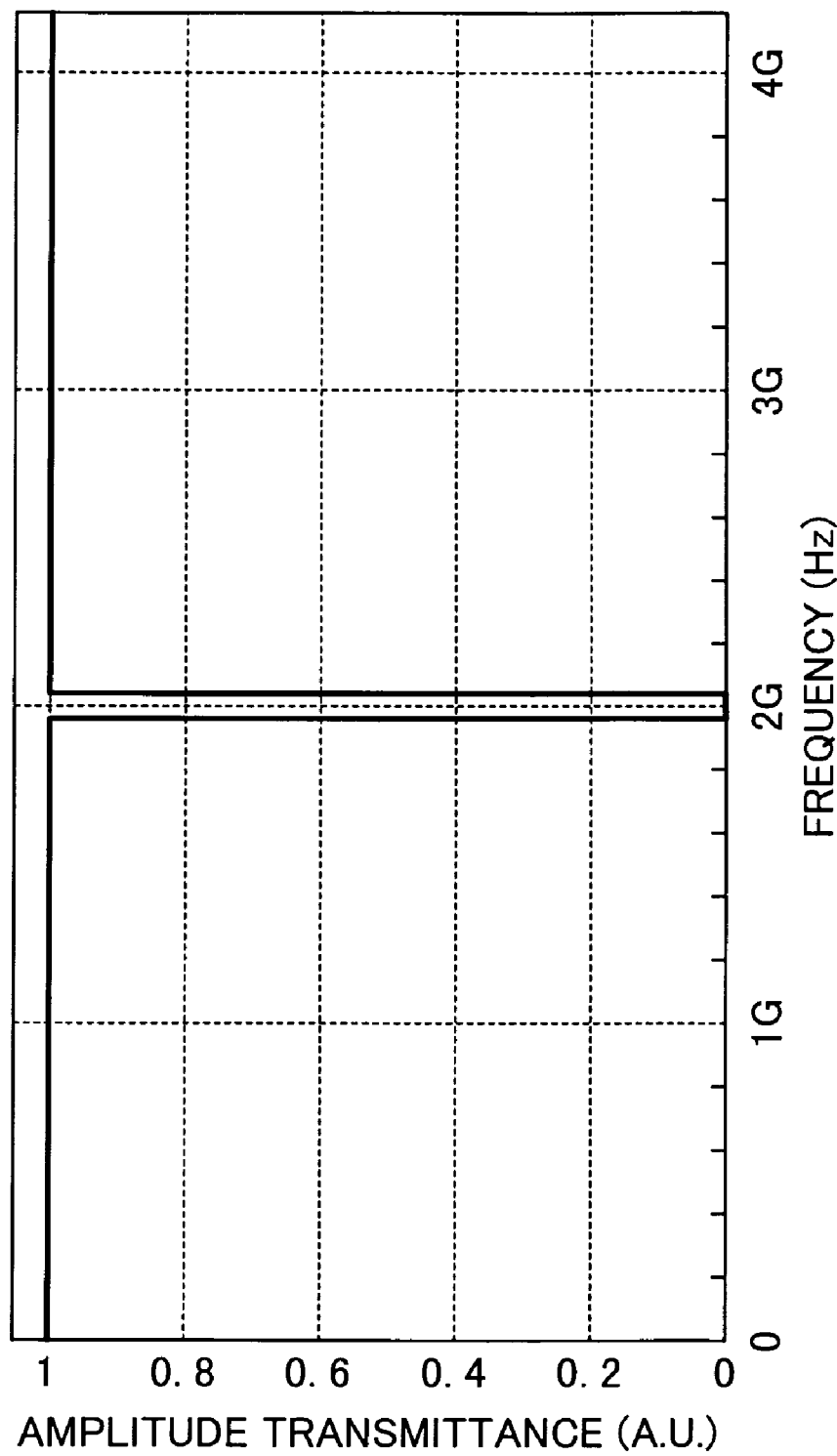

CODE DIVISION MULTIPLEX SIGNAL RECEIVING APPARATUS AND CODE DIVISION MULTIPLEX TRANSMITTING AND RECEIVING SYSTEM

BACKGROUND OF THE INVENTION

1. Field of the Invention

The present invention relates to a code division multiplex (CDM) transmitting and receiving system, and in particular to a CDM transmitting and receiving system for communication through a passive optical network. The invention also relates to a CDM signal receiver.

2. Description of the Related Art

There is great interest in passive optical networks (PONs) as a means of providing bidirectional optical communication between a network operator and a plurality of subscribers. A PON has a star network topology centered on a passive optical coupler (star coupler) that couples a single optical transmission path leading to the network operator's transmitting and receiving apparatus to a plurality of optical transmission paths leading to subscribers' transmitting and receiving units. In PON terminology, the network operator's signal transmitting and receiving apparatus is called an optical line terminal (OLT), and the subscribers' signal transmitting and receiving units are called optical network units (ONUs). The main advantage of a PON system is that by sharing the optical transmission path to the OLT among a plurality of subscribers, it can reduce system equipment costs. General descriptions of PON systems can be found in Ohnishi et al., 'Isanetto PON shisutem' (Ethernet PON system), *Fujikura Giho*, No. 102, April 2002, pp. 18-21, and Ashi et al., 'PON Based All Fiber-Optic Access System for High-speed Multimedia Services', *Hitachi Review*, Vol. 48, No. 4, 1999, pp. 229-233.

A PON system may also have a cascaded star network topology, with two or more star couplers. When ONUs are referred to in the following description, it will be understood that they are a group of ONUs connected through one or more passive optical couplers to a single OLT. Communication from the OLT to the ONUs will be referred to as downstream communication, and communication from the ONUs to the OLT as upstream communication. Communication between the OLT and N ONUs can also be described as 1-to-N communication, where N is the number of ONUs.

The conventional optical access network systems described by Ohnishi et al. and Ashi et al. employ time division multiplexing (TDM), and separate signals transmitted from different subscribers by assigning different time slots to the subscribers. PON optical access network systems may also employ code division multiplexing (CDM), with or without TDM. A PON system using CDM will also be referred to below as a CDM-PON system.

In CDM communication, the transmitter encodes and transmits a signal, and the receiver decodes the received signal by using the same code as in the transmitter. One of the advantages of CDM transmission is its inherent security, in that all communication is coded with a key shared by the transmitter and receiver (the code itself is the key). Another advantage is that multiplexed signals are transmitted simultaneously, enabling a large amount of data to be transferred while conserving communication resources such as wavelengths and time slots. Tamai et al. describe an exemplary CDM-PON system in Japanese Patent Application Publication No. 2007-228134 and disclose a ranging method by which signal timing is adjusted to compensate for the different distances between the OLT and the individual ONUs.

A CDM-PON communication system requires clock signals for ranging, decoding, gating, and other operations. TDM transmission and receiving systems generally extract clock signals from TDM signals by detecting the modulation frequency of the TDM signal. The clock signal is extracted by a device termed a clock data recovery (CDR) device.

A TDM signal, however, is a bi-level digital signal, whereas a CDM signal is a multi-level signal with more than two levels. Conventional CDR devices are designed to operate with bi-level signals and cannot recover clock signals from CDM signals.

Although CDR generally denotes the recovery of both clock and data signals from a transmitted signal, the term 'CDR' as used herein refers only to the recovery of the clock signal, and a CDR device will also be referred to as a clock recovery device.

SUMMARY OF THE INVENTION

An object of the present invention is to provide a transmitting and receiving system in which a clock signal can be recovered by a conventional clock recovery device designed to recover a clock signal from a bi-level digital signal without major alteration of the conventional CDM transmitting and receiving system configuration.

This invention derives from the observation that the frequency spectrum of a CDM signal does not include a chip-rate frequency component, that is, a component with the frequency of the code used to encode the transmitted signal. The invention generates a clock signal with a frequency equal to the chip rate, combines the clock signal with the CDM signal, and transmits the combined signal. The clock signal can then be recovered by an ordinary clock recovery device.

From the signal generated by combining the CDM signal and the clock signal, a frequency component including the clock signal can be extracted by a bandpass filter (BPF) that transmits only a narrow frequency component centered on the chip-rate frequency. The clock signal can then be recovered from the extracted component by a conventional clock recovery device designed to operate with bi-level signals.

From the same signal generated by combining the CDM signal and the clock signal, the frequency components including the CDM signal can be extracted by a band elimination filter (BEF) that blocks only a narrow frequency component centered on the chip-rate frequency of the code used to encode the transmit signal. The CDM signal components are extracted substantially intact and can be decoded to recover the received signal with no alteration of conventional decoding techniques.

More generally, the invention provides a CDM signal receiver that receives a clocked CDM signal generated by combining a CDM signal with a clock signal having a frequency equal to a null frequency disposed in a void in the frequency spectrum of the CDM signal, and recovers a clock signal from the corresponding frequency component of the clocked CDM signal.

The invention also provides a CDM transmitting and receiving system using code division multiplexing, the system comprising a CDM signal transmitter and a plurality of CDM signal receivers of the above type. The CDM transmitter comprises a CDM transmit signal processor section, a clock signal generator, and a clock signal combiner.

The CDM transmit signal processor section has a plurality of channels for coding transmit signals to generate coded transmit signals, which are multiplexed to generate a CDM signal. The clock signal generator generates a clock signal with a frequency equal to a null frequency in the frequency spectrum of the CDM signal, and outputs the clock signal. The clock signal combiner combines the CDM signal and the clock signal to generate a clocked CDM signal, which is transmitted to the CDM signal receiver.

Each CDM signal receiver comprises a clock signal splitter, a BEF, a received signal processor, a BPF, and a clock recovery device.

The clock signal splitter receives the clocked CDM signal and splits it into identical first and second clocked CDM signals. The BEF receives the first clocked CDM signal, eliminates the clock frequency component, and outputs the resulting coded received signal. The received signal processor receives the coded received signal, decodes it to recover the received signal, and outputs the received signal. The BPF receives the second clocked CDM signal, extracts the clock frequency component, and outputs the extracted component. The clock recovery device recovers a clock signal from the frequency component extracted by the BPF.

The CDM transmit signal processor section preferably comprises first to N-th transmit signal processors using different codes to generate the coded transmit signals on the first to N-th channels, where N is an integer greater than one, and a coded signal combiner for additively combining and thereby multiplexing the N coded transmit signals output to generate the CDM signal.

Each of the first to N-th transmit signal processors may comprise a header attachment unit for adding a header to a bi-level digital data signal to generate a transmit signal and outputting the transmit signal, a coding unit for encoding the transmit signal to generate a coded transmit signal and outputting the coded transmit signal, and a transmit timing adjustment unit for adjusting the transmission timing of the coded transmitted signal.

The received signal processor in each CDM signal receiver may comprise a decoding unit for decoding the coded received signal to obtain a decoded received signal for a particular channel, a gating processor for gating the decoded received signal, and a header remover for eliminating the header from the decoded received signal to generate a received signal and outputting the received signal.

Since the clock frequency is a null frequency of the CDM signal, the clock frequency component of the clocked CDM signal lacks the multi-level signal components of the CDM signal and is essentially a bi-level signal, from which the clock signal can easily be extracted by a conventional clock recovery device designed to operate with bi-level digital signals.

The coding process by which the CDM transmit signal processor section codes the transmit signal for each channel to generate the coded transmit signal will now be described in more detail, taking the first channel as an example.

The signal to be transmitted on the first channel is a bi-level digital signal representable as a sequence of bits (e.g., 1, 0, 1, . . . ). The code used for the first channel will be assumed to have a code length of four and can itself be represented as a bi-level digital signal (e.g., 1, 0, 0, 1). Although the above data (1, 0, 1 . . . ) and code (1, 0, 0, 1) will be used in the following description, the conclusions drawn apply equal to other data and other codes.

In this description, the code length refers to the number of 0's and 1's in the sequence of that specifies a code. The 0's and 1's in the code sequence are referred to as chips. In this example, the code sequence (1, 0, 0, 1) has four chips, so the code length is four. In the signal processors and coded signals, a chip is represented by an electrical pulse or an optical pulse, referred to as a chip pulse. The 0's and 1's themselves are referred to as code values. The duration of one chip pulse on the time axis is the chip period. The reciprocal of the chip period is the chip rate, and the frequency equal to the chip rate is the chip-rate frequency.

When a signal is coded, the time interval occupied by one bit of the bi-level digital signal to be coded is divided into chip periods and the signal value in each chip period is coded by one of the code values. The coding signal, consisting of repetitions of the code sequence (1, 0, 0, 1), is aligned on the time axis so that one occurrence of this code sequence matches each bit of the bi-level digital signal. In this example, the chip rate of the coding signal is four times the bit rate of the bi-level digital signal to be coded.

It is convenient to use an algebraic notation in which the value '0' is replaced by '−1'. The data transmitted on the first channel then become (1, −1, 1, . . . ) and the code used on the first channel becomes (1, −1, −1, 1). With this notation, the coding process can be described as a multiplication process in which the bi-level digital signal ('D') is multiplied by the code ('C') to obtain their product (D×C).

The first bit of the bi-level digital signal to be transmitted on the first channel is '1', the second bit is '−1', and the third bit is '1'. In the coding process the first bit value '1' is multiplied by each of the code values (1, −1, −1, 1), then the second bit value '−1' is multiplied by each of the same code values (1, −1, −1, 1), and the third bit '1' is likewise multiplied by each of the code values (1, −1, −1, 1). For the first and third bits, which have values of '1', the result is:

(1×1, 1×−1, 1×−1, 1×1)=(1, −1, −1, 1).

For the second bit, which has a value of '−1', the result is:

(−1×1, −1×−1, −1×−1, −1×1)=(−1, 1, 1, −1).

The bi-level digital signal (1, −1, 1, . . . ) is accordingly coded to a signal with the following chip values:

(1, −1, −1, 1, −1, 1, 1, −1, 1, −1, −1, 1, . . . )

In the conventional notation these values can also be represented as:

(1, 0, 0, 1, 0, 1, 1, 0, 1, 0, 0, 1, . . . )

In CDM communication in a PON system according to the invention, each transmit signal is coded as a bi-level electrical signal in non-return to zero (NRZ) format, then converted to an optical signal, and finally multiplexed with the optical signals on other channels for transmission through the passive optical fiber network. In the coded optical signal on each channel, a '1' indicates the presence of a light pulse and a '0' (or '−1' in algebraic notation) indicates the absence of a light pulse.

When a P-bit bi-level digital transmit signal is coded with a code having code length Q, the coded transmit signal is a sequence of P×Q chips, where P and Q are positive integers. The code length Q is also referred to as the code spreading rate.

As described later, the CDM signal generated by the CDM transmit signal processor section has null frequencies at the integer multiples of the chip-rate frequency. In particular, the frequency spectrum of the CDM signal lacks a frequency component corresponding to the chip rate.

A clocked CDM signal is generated by combining a CDM signal and a clock signal with frequency corresponding to the chip rate by wave superposition. Since the CDM signal originally had no frequency component equal to the chip rate, when the clock signal is extracted from the clocked CDM signal, the extracted clock signal is unaffected by the CDM signal, and when the clock signal is removed, the remaining CDM signal is free from effects of the clock signal.

This means that the band elimination filter that eliminates the clock frequency component from the first CDM signal outputs a coded received signal that has no frequency component equal to the clock signal frequency and is free from effects of the clock signal. Apart from generally having a different mean intensity, the coded received signal output from the BEF has same temporal waveform as the CDM signal generated by the CDM signal transmitter; that is, both signals have the same waveshape.

When the coded received signal output from the BEF is decoded by the received signal processor to recover the received signal, since the temporal waveform of the coded received signal has the same shape as the temporal waveform of the CDM signal generated at the CDM signal transmitter, the received signal can be recovered by decoding with the same code as was used at the CDM signal transmitter.

The CDM signal generated at the CDM signal transmitter is a multiplexed signal including coded transmit signals that are generated by coding different signals with different codes for different channels. In the decoding process, only the signal coded with the code of the channel assigned to the received signal processor is recovered as a received signal. The signals coded with codes for other channels are eliminated, or reduced to background noise.

Similarly, the bandpass filter that passes the frequency component centered on the clock signal frequency and eliminates the other frequency components from the second CDM signal outputs a signal having the same general shape as the clock signal that was originally added to create the clocked CDM signal, and is free from any effects of the CDM signal itself.

Therefore, a conventional clock recovery device designed to operate with bi-level signals can recover a clock signal from the signal output from bandpass filter. The conventional clock recovery device does not have to be modified or enhanced in any way.

In a CDM communication system according to the invention, a clock signal can be recovered by a conventional clock recovery device, by providing a clock signal generator in the CDM transmit signal processor section of a conventional CDM transmitting and receiving system, and by providing a clock signal splitter, BEF, and BPF in the CDM signal receiving units, leaving the other parts of the transmitter and receiver structure substantially unaltered.

When first to N-th transmit signal processors and a coded signal combiner are provided in the CDM transmit signal processor section as described above, communication can be carried out as follows. The first to N-th transmit signal processors generate and output coded transmit signals for the first to the N-th channels, respectively. The coded signal combiner combines the coded transmit signals output from the first to the N-th transmit signal processors to generate and output a CDM signal.

A CDM signal transmitter comprising a CDM transmit signal processor section as described above transmits downstream to N CDM signal receivers. In the CDM signal transmitting and receiving system, the CDM signal transmitter functions as an OLT and the N CDM signal receivers as ONUs. In this configuration, the first to N-th channels are assigned to the N CDM signal receivers, also referred to as ONU-1 to ONU-N, respectively.

This configuration permits CDM to be used for multicast or broadcast communication in the downstream direction. When some of the ONUs can transmit upstream signals, CDM can also be used for bidirectional communication between these ONUs and the OLT.

When each of the first to the N-th transmit signal processors comprises a header attachment unit, a coding unit and a transmit timing adjustment unit, synchronous CDM transmission is possible. The header attachment unit adds a header to a bi-level digital transmit signal to generate and output a transmit signal. The coding unit receives the transmit signal, and generates and outputs a coded transmit signal. The transmit timing adjustment unit receives the coded transmit signal and adjusts the transmission timing.

In a synchronous CDM-PON system, a ranging procedure is used to adjust the receiving timing of the upstream signals in order to compensate for the different distances between the OLT and the individual ONUs. Accordingly, in the upstream CDM signal, the pulses transmitted by different ONUs are aligned with nominally identical chip and bit boundaries on the time axis. The clock signal extracted from the second CDM signal is used in the ranging procedure.

The received signal processor as above comprises a decoding unit for decoding a coded received signal to generate and output a decoded receive signal, a gating processor for gating the decoded received signal, and a header remover for eliminating the header from the decoded received signal output from the gating processor to generate and output a received signal. The gating processor can also effectively remove noise components in the coded received signal, and thereby reduce errors in data transmission between the CDM signal transmitter and the CDM signal receiver. The clock signal extracted from the second CDM signal is also used for this gating purpose.

BRIEF DESCRIPTION OF THE DRAWINGS

In the attached drawings:

FIG. 11 is a graph showing the amplitude transmittance of the BEF;

DETAILED DESCRIPTION OF THE INVENTION

Figure 1:
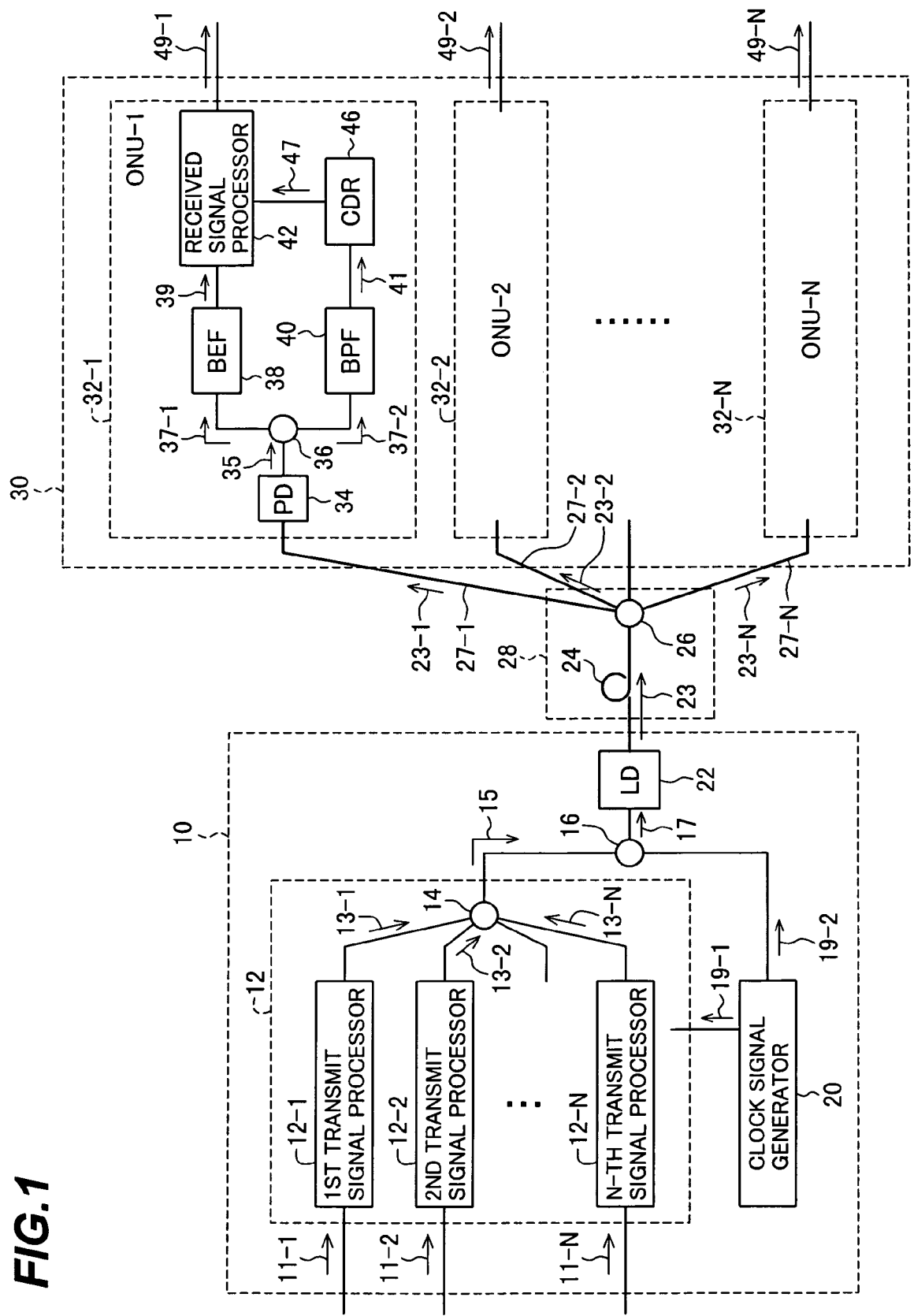
FIG. 1 is a schematic block diagram of a CDM-PON system in an embodiment of the present invention.
Figure 4:
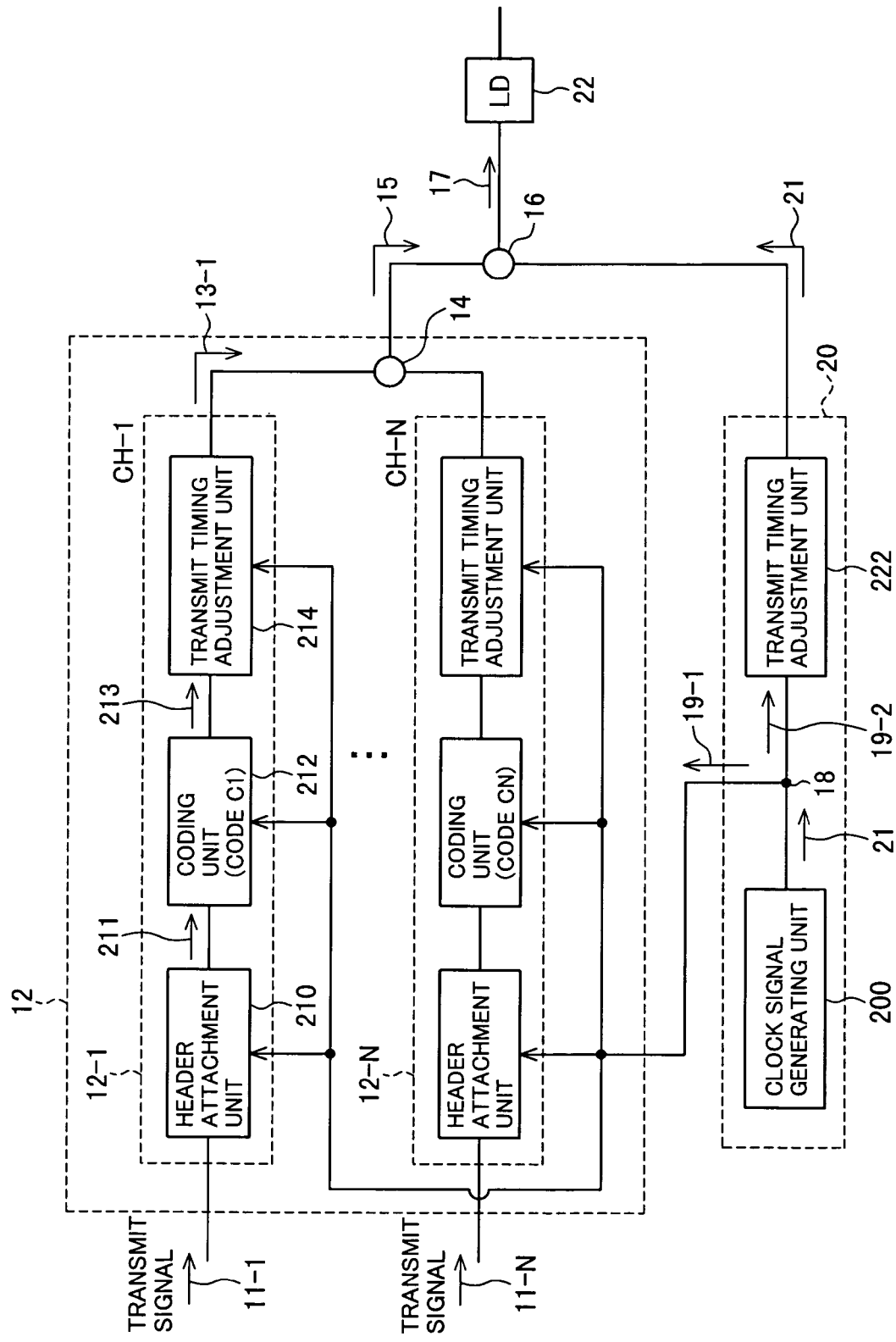
FIG. 4 is a schematic block diagram illustrating the internal structure of the CDM transmit signal processor section and clock signal generator in FIG. 1.
Figure 5:
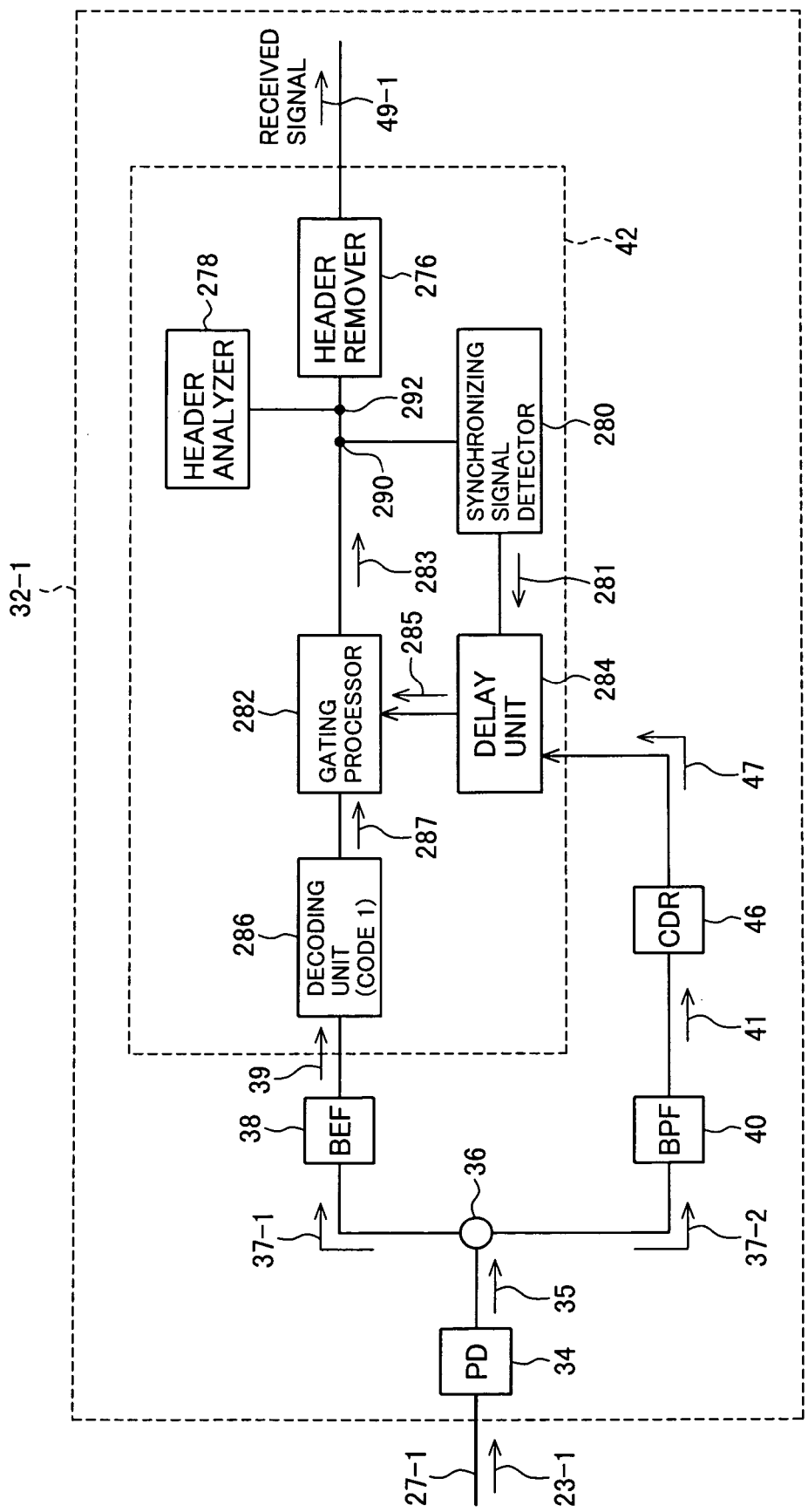
FIG. 5 is a schematic block diagram illustrating the internal structure of the first CDM signal receiving unit in FIG. 1.

An embodiment of the invention will now be described with reference to the attached drawings, in which like elements are indicated by like reference characters. Repeated descriptions of like elements will be omitted. In FIGS. 1, 4, and 5, optical signal paths such as optical fibers are depicted by thick lines, and electrical signal paths are depicted by thin lines. It will be appreciated that these three drawings show exemplary structures in a general and schematic manner, and that the invention is not limited to the structures shown in these drawings.

The invention can also be practiced in configurations in which the OLT and ONUs communicate over electrical signal wires, without using optical signals, or communicate by wireless transmission. In the wireless case, the OLT may include a device for converting electrical signals to radio waves and transmitting the radio waves and the ONUs may include devices for receiving the radio waves and converting the received radio waves to electrical signals. As electrical signal communication and wireless communication are familiar technologies to those skilled in the art, however, only a PON-based CDM transmitting and receiving system will be described as the best embodiment of the invention.

Referring to FIG. 1, the CDM-PON communication system in the embodiment of the invention comprises an OLT 10 and N CDM signal receiving units 32-1 to 32-N (N is an integer greater than one) that use the first to the N-th channels, respectively. In FIG. 1, the CDM signal receiving unit 32-1 assigned to the first channel is denoted ONU-1; the CDM signal receiving units 32-2 to 32-N assigned to the second to the N-th channels are denoted ONU-2 to ONU-N.

A CDM communication system according to the invention can be constructed with one CDM transmitter and one CDM receiver, but in a preferred PON communication system according to the invention carries out 1-to-N communication using one CDM transmitter and N CDM receivers. Therefore, the CDM communication system in this embodiment comprises N identically structured CDM receivers ONU-1 to ONU-N. The structure and operation of ONU-1 will be described as a representative of the CDM receivers in the CDM communication system according to the invention.

The OLT 10 comprises a CDM transmit signal processor section 12, a clock signal generator 20, a clock signal combiner 16 and a semiconductor laser diode (LD) 22. The clock signal generator 20 supplies a clock signal 19-1 to the CDM transmit signal processor section 12, and outputs a clock signal 19-2 to the clock signal combiner 16. The clock signal combiner 16 combines clock signal 19-2 with a CDM signal 15 output from the CDM transmit signal processor section 12 to generate a clocked CDM signal 17. The semiconductor laser diode 22 converts the clocked CDM signal 17 to a clocked CDM signal 23 in optical signal form, and outputs the clocked CDM signal 23.

The CDM transmit signal processor section 12 comprises N transmit signal processors 12-1 to 12-N and a coded signal combiner 14. The N transmit signal processors 12-1 to 12-N are assigned to the first to the N-th channels, respectively: they receive respective bi-level digital transmit signals 11-1 to 11-N, code these signals by respective codes, and output the resulting coded transmit signals 13-1 to 13-N to the coded signal combiner 14. The coded signal combiner 14 combines the coded transmit signals 13-1 to 13-N to generate and output the CDM signal 15.

The clock signal generator 20 generates a clock signal having a frequency equal to a null frequency in the frequency spectrum of the CDM signal 15, and splits this clock signal into two identical parts 19-1 and 19-2.

The clock signal combiner 16 combines clock signal 19-2 with the CDM signal 15 to generate and the clocked CDM signal 17. The clocked CDM signal 17 is converted to an optical signal by the 22, and enters the passive optical network (PON) 28 as the clocked CDM signal 23.

The passive optical network 28 comprises an optical fiber 24, 1-to-N star coupler 26, and N branch optical fibers 27-1 to 27-N. The star coupler 26 is connected to the optical fiber 24 and the branch optical fibers 27-1 to 27-N. The distant ends of the branch optical fibers 27-1 to 27-N are connected to the CDM signal receiving units 32-1 to 32-N.

The clocked CDM signal 23 is transmitted through the optical fiber 24, enters the star coupler 26 and is split into clocked CDM signals 23-1 to 23-N, which enter the CDM signal receiving units 32-1 to 32-N, respectively. The clocked CDM signals 23-1 to 23-N are multi-valued digital signals having temporal waveforms similar to that of the clocked CDM signal 23, but with 1/N-th the signal strength of the clocked CDM signal 23.

The ONU group 30 includes N CDM signal receiving units 32-1 to 32-N that function as ONU-1 to ONU-N, respectively. The CDM signal receiving units 32-1 to 32-N recover and output respective received signals 49-1 to 49-N.

Since the CDM signal receiving units 32-1 to 32-N have same structure, only the first CDM signal receiving unit 32-1 (ONU-1) will be described in detail below.

The first CDM signal receiving unit 32-1 comprises a photodiode 34, a CDM signal splitter 36, a BEF 38, a BPF 40, a received signal processor 42, and a clock recovery device (CDR) 46. The photodiode 34 converts the clocked CDM signal 23-1 to an electrical clocked CDM signal 35, and outputs the electrical clocked CDM signal 35. The CDM signal splitter 36 receives the electrical clocked CDM signal 35 and splits it into a first CDM signal 37-1 and a second CDM signal 37-2.

The second CDM signal 37-2 enters the BPF 40, which extracts and outputs a narrow frequency component 41 centered on the clock signal frequency. The clock recovery device 46 recovers a clock signal 47 from the frequency component 41 extracted by the BPF 40, and supplies the clock signal 47 to the received signal processor 42.

The first CDM signal 37-1 enters the BEF 38, which eliminates the frequency component equal to the clock signal frequency from the first CDM signal 37-1, and outputs a coded received signal 39. The coded received signal 39 enters the received signal processor 42, which decodes, gates, and eliminates header information from the received signal processor 42 to recover the received signal 49-1. For brevity, this process will be described by simply saying that the received signal processor 42 decodes the coded received signal 39.

The occurrence of null frequencies in the CDM signal 15 at integer multiples of the frequency corresponding to the chip rate of the CDM signal 15 and the reason why the frequency spectrum of the CDM signal 15 lacks a frequency component corresponding to the chip rate will be explained with reference to FIGS. 2A to 2C and FIG. 3.

Figure 2:
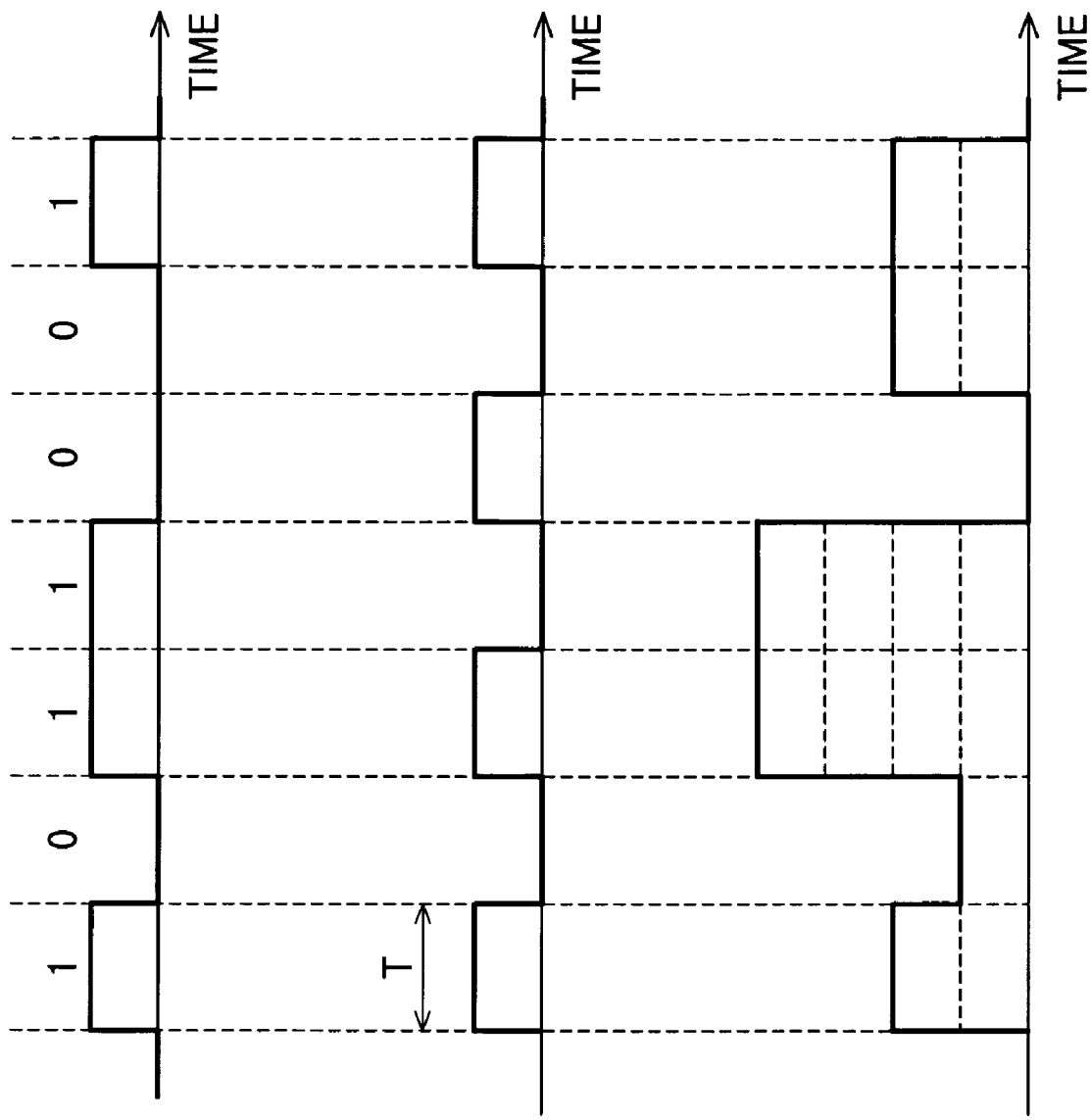
FIG. 2A illustrates the bi-level waveform of an NRZ bi-level coded signal.
FIG. 2B illustrates a chip clock waveform.
FIG. 2C illustrates the multi-level waveform of a CDM signal.

FIGS. 2A to 2C illustrate the process by which NRZ bi-level coded signals are multiplexed to form a multi-level digital CDM signal.

FIG. 2A shows the temporal waveform of an exemplary NRZ bi-level digital coded transmit signal expressing a chip train (1, 0, 1, 1, 0, 0, 1, . . . ) generated by coding a bi-level data signal (not shown).

The waveform (1, 0, 1, 0, 1, 0, 1, . . . ) in FIG. 2B illustrates the chip rate. The chip period is T, so the chip rate is 1/T. When a bi-level transmit signal is coded at this chip rate, the coded signal has a null frequency at 1/T. If the chip period is half a nanosecond (0.5 ns), for example, the chip rate is two gigahertz (1/(0.5 ns)=2 GHz), so there is a null frequency at 2 GHz. The signal shown in FIG. 2A was generated by coding a data signal at the chip rate shown in FIG. 2B.

FIG. 2C shows the waveform of a multi-level digital CDM signal generated by multiplexing a plurality of NRZ bi-level digital coded transmit signals of the general type shown in FIG. 2A. The multi-level digital CDM signal is a train of rectangular pulses of varying heights, occurring at a pulse rate of 1/T. The fundamental frequency in the frequency spectrum of this CDM signal is 1/T.

If a Fourier transform is applied to a rectangular pulse waveform with a fundamental frequency of 1/T, the resulting frequency spectrum has an amplitude given by the expression $\sin(\pi Tf)/(\pi Tf)$, where f is a variable representing frequency. In terms of intensity or power, the amplitude is given by the expression $|\sin(\pi Tf)/(\pi Tf)|^2$. These expressions $\sin(\pi Tf)/(\pi Tf)$ and $|\sin(\pi Tf)/(\pi Tf)|^2$ become zero when f is an integer multiple of 1/T. Null frequencies therefore occur at integer multiples of the fundamental frequency (that is, at frequencies $f=n \times (1/T)$, where $n=1, 2, 3, \ldots$).

Figure 3:
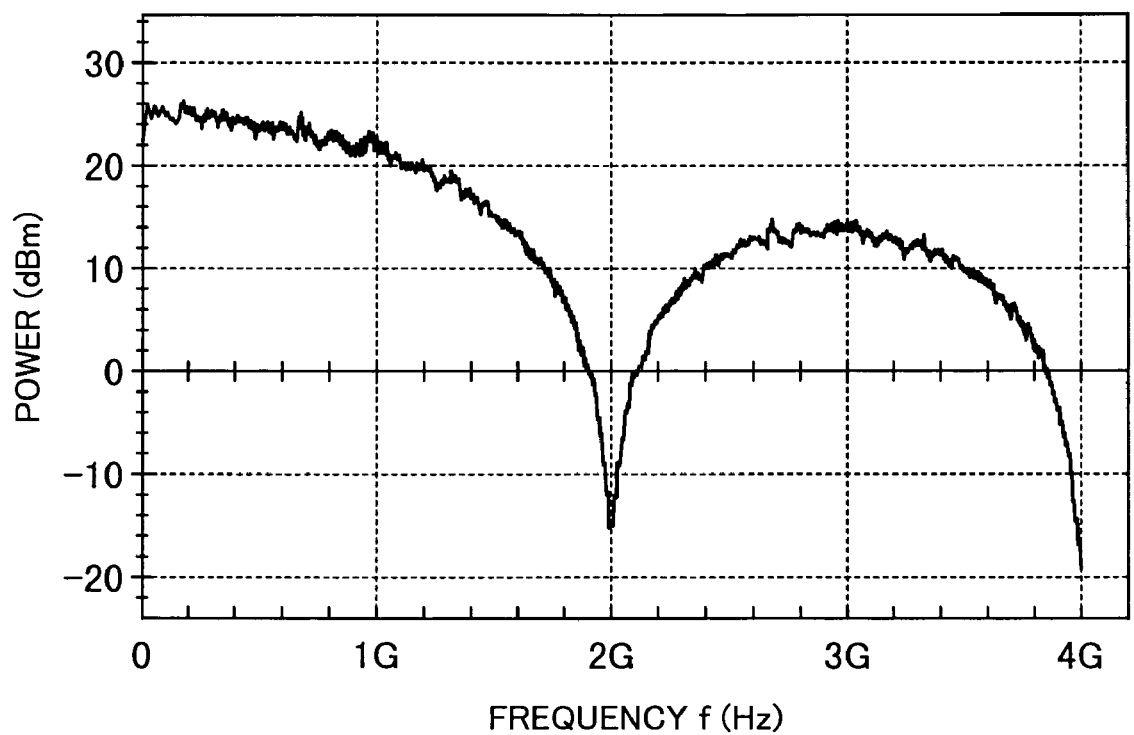
FIG. 3 is a graph illustrating an exemplary frequency spectrum of a CDM signal.

FIG. 3 illustrates an exemplary frequency spectrum of a multi-valued digital CDM signal with a chip period T of 0.5 ns, that is, a chip rate or frequency of 2 GHz. The horizontal axis represents the frequency f while the vertical axis represents the power of the frequency spectrum in decibels referenced to one milliwatt (dBm). Since the chip frequency is 2 GHz, there are null frequencies at 2 GHz, 4 GHz (=2×(2 GHz)), and so on.

In FIG. 3, the power of the frequency spectrum is not equal to zero at the null frequency f, but has a relatively small value of −15 dBm. This is because the frequency spectrum shown in FIG. 3 is derived from a multi-valued digital CDM signal of the type actually used for communication. The multi-valued digital CDM signal is accordingly deformed by noise and its temporal waveform is not made up of mathematically perfect rectangles. In actual CDM communication, however, the receiving apparatus ignores signal components as weak as −15 dBm, so in actual CDM communication, the frequencies of 2 GHz and 4 GHz shown in FIG. 3 can be treated as null frequencies.

The internal structure of the CDM transmit signal processor section 12 and the clock signal generator 20 and the operations by which they generate and output the clocked CDM signal 17 will be described with reference to the schematic block diagram in FIG. 4.

The CDM transmit signal processor section 12 comprises transmit signal processors 12-1 to 12-N. The first transmit signal processor 12-1 receives a bi-level digital transmit signal 11-1 for the first channel, and generates and outputs a coded transmit signal 13-1. Similarly, transmit signal processors 12-2 to 12-N receive bi-level digital transmit signals 11-2 to 11-N, and generate and output respective coded transmit signals 13-1 to 13-N.

The coded signal combiner 14 combines the coded transmit signals 13-1 to 13-N to generate and output the CDM signal 15.

Since the transmit signal processors 12-1 to 12-N have identical structures, only the first transmit signal processor 12-1 will be described. The first transmit signal processor 12-1 comprises a header attachment unit 210, a coding unit 212 and a transmit timing adjustment unit 214. The header attachment unit 210 adds a header to bi-level digital signal 11-1 to generate and output a transmit signal 211. The coding unit 212 receives the transmit signal 211, generates a coded transmit signal 213 and outputs the coded transmit signal 213. The transmit timing adjustment unit 214 receives the coded transmit signal 213 and adjusts its transmission timing.

The coding unit 212 in transmit signal processor 12-1 employs a code C1 assigned to the first channel. The coders in transmit signal processors 12-2 to 12-N employ codes C2 to CN assigned to the second to N-th channels, respectively.

By adding headers to the bi-level digital transmit signal 11-1, the header attachment unit 210 generates a transmit signal 211 consisting of successive frames, each frame including part of the bi-level digital signal to be transmitted (the payload) and a header containing control information. A frame is also referred to as a packet.

A frame is the basic unit of downstream communication in the PON system, from the OLT 10 to the ONUs 30. Downstream communication is accordingly a type of packet communication, and the purpose of the header attachment unit 210 is to generate the packet headers. In the following description, however, the division of the transmit signal into frames will simply be assumed, and a frame will be simply referred to as a transmit signal.

The clock signal generator 20 comprises a clock signal generating unit 200, a clock signal splitter 18, and a transmit timing adjustment unit 222. The clock signal splitter 18 splits the clock signal 21 output from the clock signal generating unit 200 into the clock signal 19-1 supplied to the CDM transmit signal processor section 12 and the clock signal 19-2 combined with the CDM signal 15.

Clock signal 19-2 is input to the transmit timing adjustment unit 222, where it is matched to the transmission timing of the CDM signal 15. Specifically, the transmit timing adjustment unit 222 delays clock signal 19-2 by an adjustable amount that brings the delayed clock signal 21 into phase with the CDM signal 15 when they are combined by the clock signal combiner 16 to generate the clocked CDM signal 17.

As shown in FIG. 4, clock signal 19-1 is supplied to the header attachment unit 210, coder 212, and transmit timing adjustment unit 214 in all of the transmit signal processors 12-1 to 12-N. The header attachment unit 210 adds a header using clock signal 19-1 as a timing reference. Similarly, the coding process performed by the coder coding unit 212 and the transmission timing adjustment process carried out by the transmit timing adjustment unit 214 use clock signal 19-1 as a reference.

In a CDM-PON communication system, the N ONUs in the ONU group 30 are generally located at different distances from the OLT. To compensate for this difference in distance, a ranging process is carried out to adjust the timing of the upstream signals. The ranging process can be carried out by the method described by Tamai et al. in JP 2007-228134, for example. The transmit timing adjustment units 214 and 222 play an important role in the ranging process.

In one version of the ranging procedure, the transmission timing adjusters 214 in the transmit signal processors 12-1 to 12-N add delays to command signals transmitted to the ONUs, and the delays are adjusted until the returning response signals are properly synchronized. In another version of the ranging procedure, the transmit timing adjustment unit 222 in the clock signal generator 20 is also used to adjust the phase of the clock signal 21 transmitted to the ONUs. Once ranging has been accomplished, downstream communication to the ONUs is carried out by synchronous CDM.

Next, since the second CDM signal receiving units 32-2 to 32-N to which the second to the N-th channels are assigned have same structure as first CDM signal receiving unit 32-1 and operate in the same way, the structure and operation of the first CDM signal receiving unit 32-1 (ONU-1) will be described as a representative of all of them.

Referring to FIG. 5, the first CDM signal receiving unit 32-1 comprises a photodiode 34, a CDM signal splitter 36, a BEF 38, a BPF 40, a clock recovery device 46, and a received signal processor 42. The photodiode 34 converts the optical clocked CDM signal 23-1 to an electrical clocked CDM signal 35 and outputs the electrical clocked CDM signal 35. The CDM signal splitter 36 receives the electrical clocked CDM signal 35 and splits it into a first CDM signal 37-1 and a second CDM signal 37-2.

The second CDM signal 37-2 is input to the BPF 40, which extracts and outputs a frequency component 41 including the clock signal. The clock recovery device 46 recovers the clock signal 47 from the frequency component 41 extracted by the BPF 40 and supplies the clock signal 47 to the received signal processor 42.

The extracted frequency component 41 is narrow enough that it does not include any of the multi-valued CDM signal components of the clocked CDM signal 35. The extracted frequency component 41 is therefore free from multi-valued digital signal pulses. The frequency component 41 includes only a substantially sinusoidal wave component supplied by the clock signal generator 20 in the OLT 10, so the clock signal 47 can be extracted by a conventional clock recovery device designed to recover a clock signal from a bi-level digital signal.

The first CDM signal 37-1 enters the BEF 38, which eliminates a narrow frequency component centered on the clock signal frequency to generate a coded received signal 39, and outputs the coded received signal 39. The coded received signal 39 enters the received signal processor 42.

The received signal processor 42 comprises a decoding unit 286, a gating processor 282, a header analyzer 278, a header remover 276, a synchronizing signal detector 280, and a delay unit 284. The decoding unit 286 uses the code C1 assigned to the first channel.

The received signal 49-1 is obtained from the coded received signal 39 in a series of steps in which the coded received signal 39 first enters the decoding unit 286, is decoded, and is output as a received data signal 287. The received data signal 287 includes a noise component in addition to the received data of the first channel. The gating processor 282 reduces the noise component. The received data signal frame 287 enters the gating processor 282, which blocks the noise component and outputs received data signal frames 283 to the header remover 276. The header remover 276 eliminates the header from each received data signal frame and outputs the remaining payload data as the received signal 49-1.

The gating processor 282 gates the received data signal 287 by opening and closing a window timed with reference to a synchronizing signal 285 output from the delay unit 284. The delay unit 284 generates the synchronizing signal 285 by adjusting the phase of a synchronizing signal 281 output from the synchronizing signal detector 280 so that the window of the gating processor 282 is opened in synchronization with the transmitted frames. The synchronizing signal detector 280 uses splitter 290 to tap the received data signal frames 283, generates the synchronizing signal 281 from the received data signal frames 283 and outputs the synchronizing signal 281.

The header analyzer 278 uses splitter 292 to tap the received data signal frames 283, analyzes the header of each frame, and identifies the frame as a frame sent from the OLT 10.

The delay unit 284 also receives the clock signal 47 extracted by the clock recovery device 46. The delay unit 284 operates in synchronization with the clock signal 47 so that the gating processor 282 opens its window in synchronization with the transmitted frames.

As described above, the received signal processor 42 receives the coded received signal 39, decodes the coded received signal 39, generates a received signal 49-1 from the coded received signal 39 and outputs the received signal 49-1.

A simulation was carried out to confirm that it is possible to combine a CDM signal and a clock signal having a frequency equal to a null frequency of the CDM signal, send the combined signal, split the CDM signal at the receiver using a BEF and a BPF, and recover the clock signal. The result of the simulation will be described with reference to FIGS. 6A and 6B to 16A and 16B.

Figure 6A:
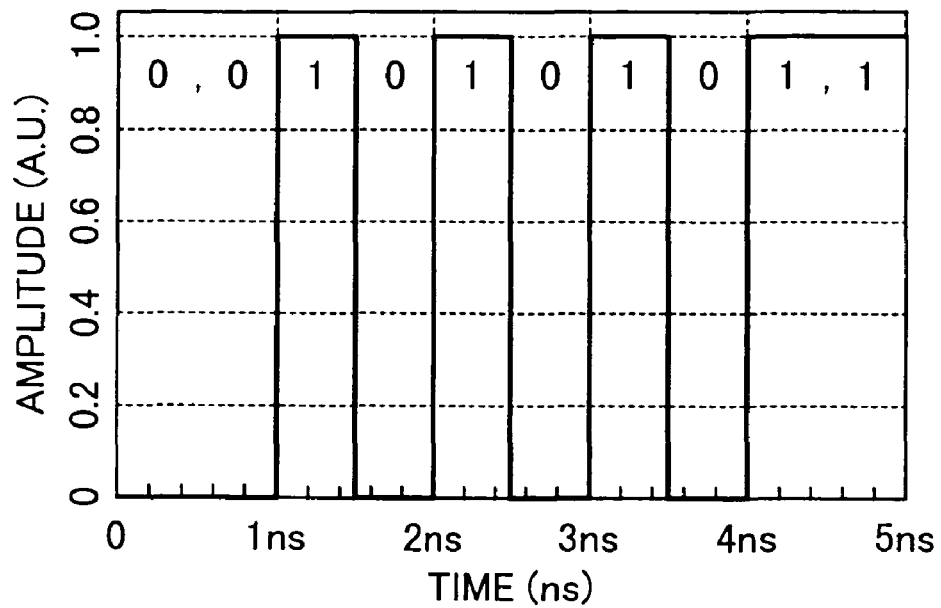
FIG. 6A shows an exemplary waveform of a coded first-channel signal.
Figure 6B:
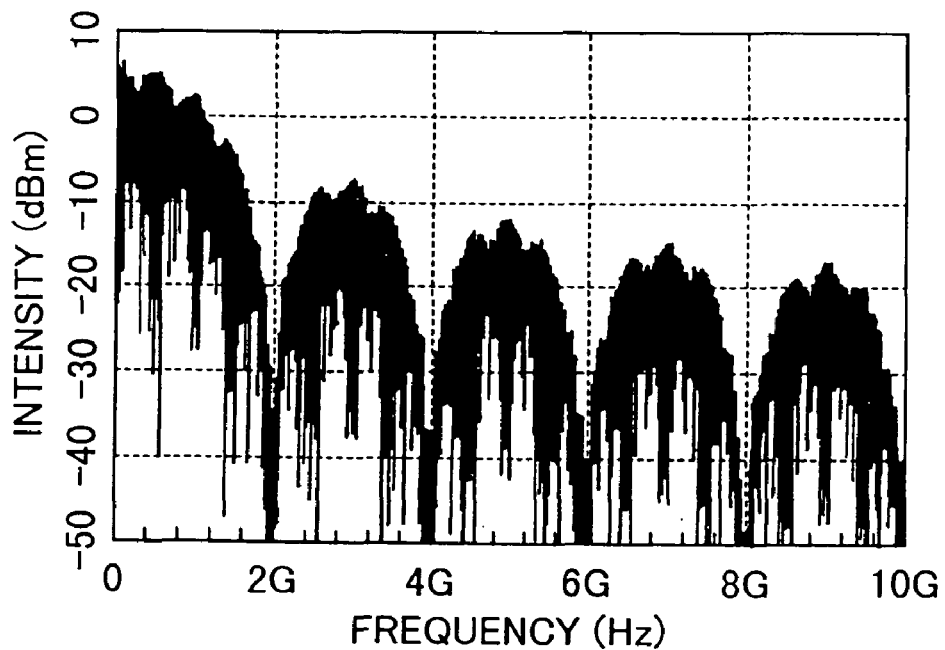
FIG. 6B shows the frequency spectrum of the signal in FIG. 6A.

FIGS. 6A and 6B illustrate the temporal waveform and frequency spectrum of the coded transmit signal 13-1 output from the transmit signal processor 12-1 to which the first channel is assigned in the OLT 10. FIG. 6A shows the temporal waveform of the coded transmit signal 13-1, with the horizontal axis representing time in nanoseconds (ns) and the vertical axis representing amplitude in arbitrary units (A.U.). FIG. 6B shows the frequency spectrum of the coded transmit signal 13-1, with the horizontal axis representing frequency in hertz (Hz) and the vertical axis representing intensity in decibels (dBm). As shown in FIG. 6A, the coded transmit signal 13-1 is coded with a chip period of 0.5 ns. That is, the chip-rate frequency of the coded transmit signal 13-1 is 2 GHz. The coded transmit signal 13-1 shown in FIG. 6A is (0, 0, 1, 0, 1, 0, 1, 0, 1, 1, . . . ). As shown in FIG. 6B, null frequencies occur at 2 GHz, 4 GHz, 6 GHz, 8 GHz, 10 GHz, and so on.

Figure 7A:
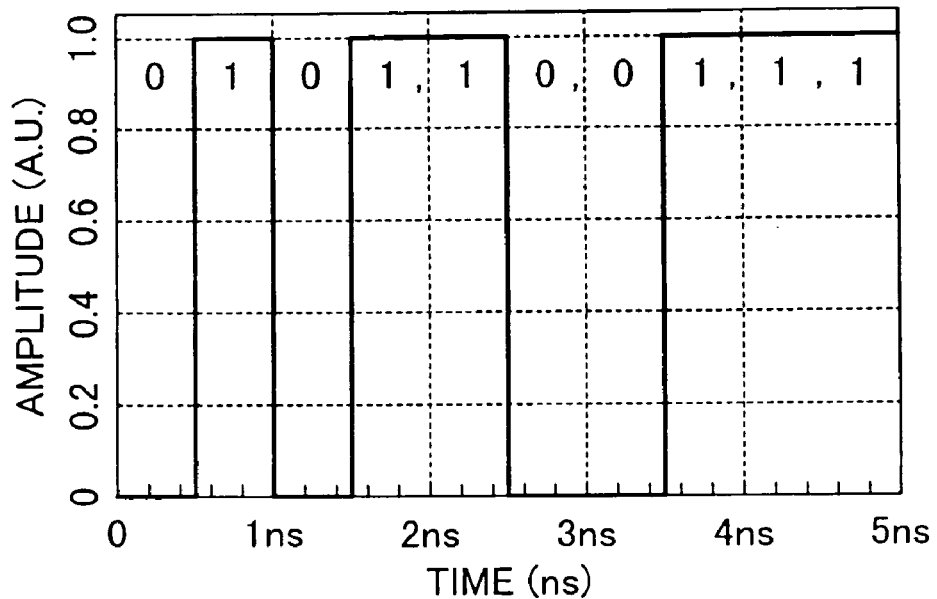
FIG. 7A shows an exemplary waveform of a coded second-channel signal.
Figure 7B:
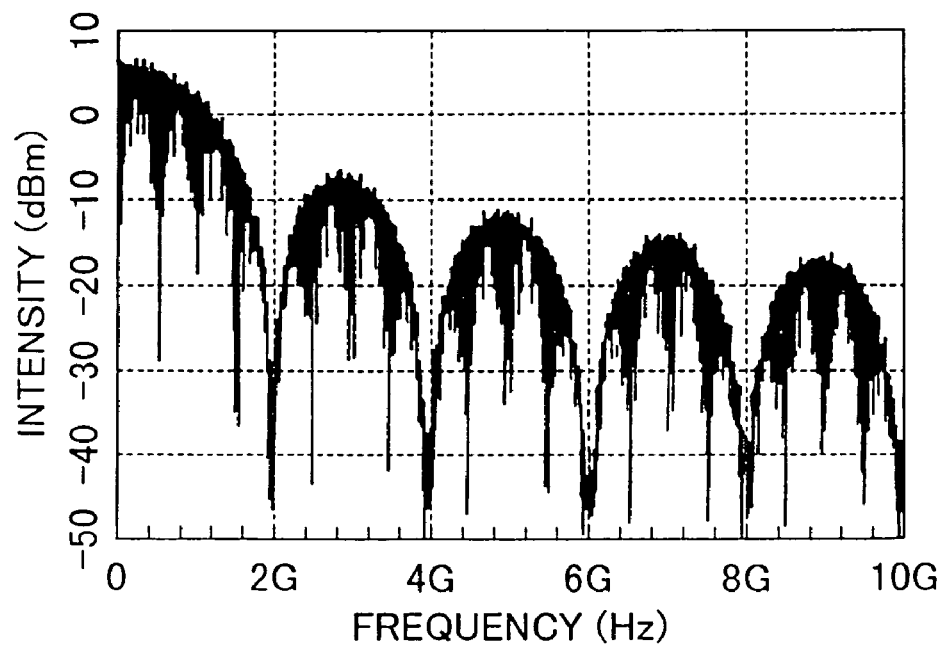
FIG. 7B shows the frequency spectrum of the signal in FIG. 6A.

FIGS. 7A and 7B illustrate the temporal waveform and frequency spectrum of the coded transmit signal 13-2 output from the transmit signal processor 12-2 to which the second channel is assigned in the OLT 10. FIG. 7A shows the temporal waveform of the coded transmit signal 13-2, with the horizontal axis representing time in nanoseconds and the vertical axis representing amplitude. FIG. 7B shows the frequency spectrum of the coded transmit signal 13-2, with the horizontal axis representing frequency in hertz and the vertical axis representing intensity in decibels. As shown in FIG. 7A, the coded transmit signal 13-2 is coded with a chip period of 0.5 ns. That is, the chip-rate frequency of the coded transmit signal 13-2 is 2 GHz. The coded transmit signal 13-2 shown in FIG. 7A is (0, 1, 0, 1, 1, 0, 0, 1, 1, 1, ... ). As shown in FIG. 7B, null frequencies occur at 2 GHz, 4 GHz, 6 GHz, 8 GHz, 10 GHz and so on.

Figure 8A:
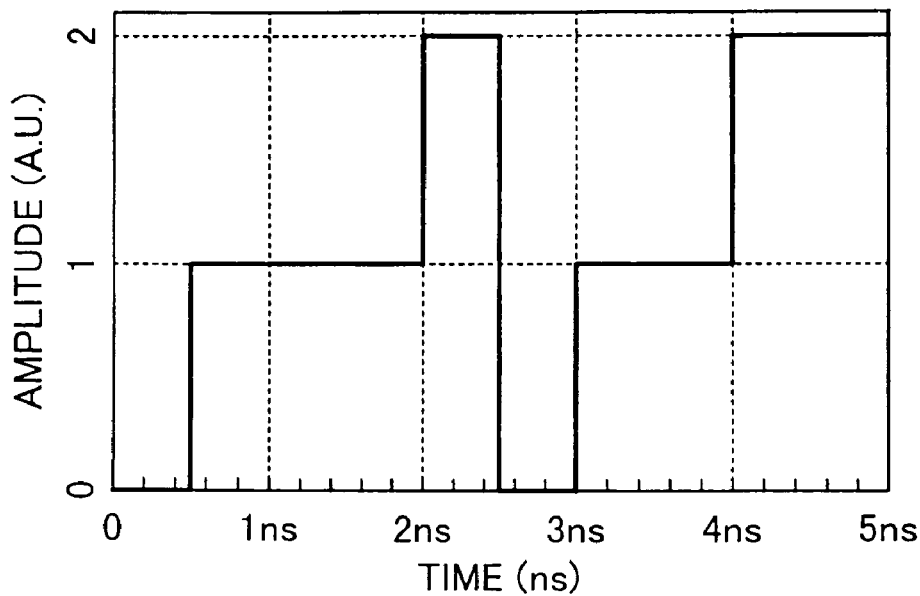
FIG. 8A shows the waveform of a CDM signal generated by multiplexing the signals in FIGS. 6A and 7A.
Figure 8B:
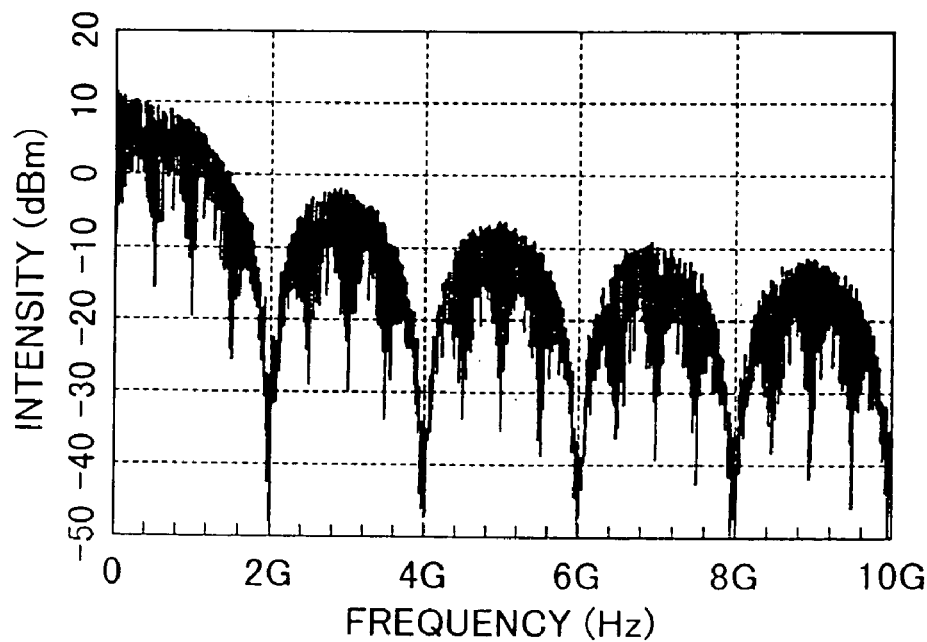
FIG. 8B shows the frequency spectrum of the CDM signal in FIG. 8A.

FIGS. 8A and 8B illustrate the temporal waveform and frequency spectrum of the CDM signal 15 generated by multiplexing the first and the second channels. FIG. 8A shows the temporal waveform of the CDM signal 15, with the horizontal axis representing time in nanoseconds and the vertical axis representing amplitude. FIG. 8B shows the frequency spectrum of the CDM signal 15, with the horizontal axis representing frequency in hertz and the vertical axis representing intensity in decibels. As shown in FIG. 8A, the fundamental period of the CDM signal 15 is 0.5 ns. Since the CDM signal 15 is a CDM signal generated by multiplexing the first and the second channels, it is a three-valued digital signal having levels of 0, 1, and 2, with a maximum amplitude that is twice the amplitude of the original signals. As shown in FIG. 8B, null frequencies in the frequency spectrum of the CDM signal 15 occur at 2 GHz, 4 GHz, 6 GHz, 8 GHz, 10 GHz and so on.

Figure 9A:
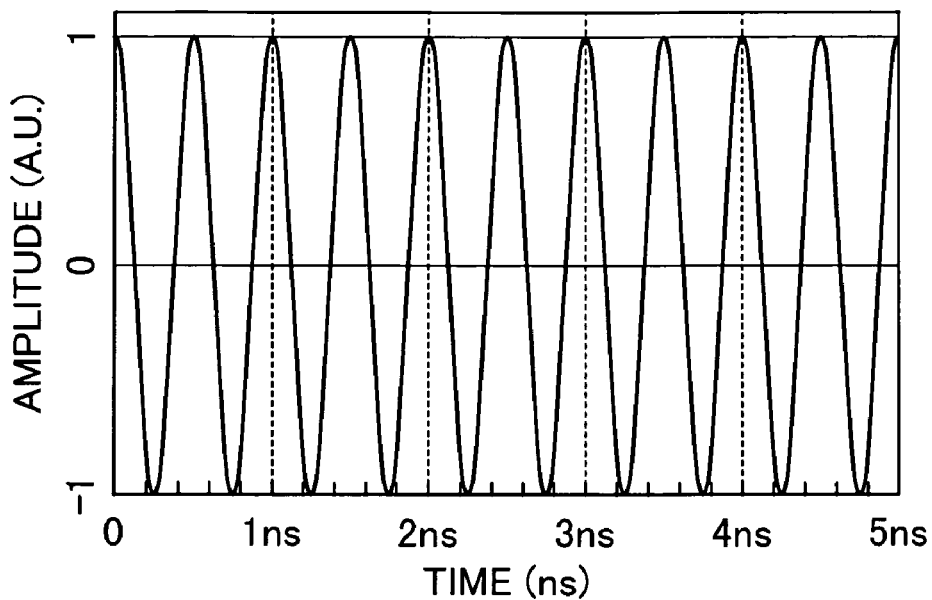
FIG. 9A shows an exemplary waveform of the clock signal generated by the clock signal generator.
Figure 9B:
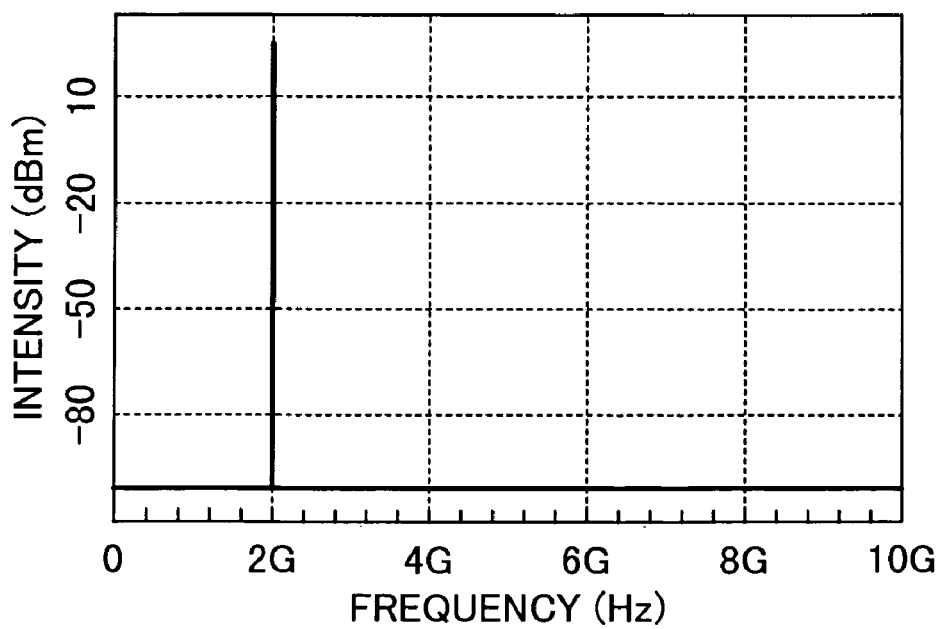
FIG. 9B shows the frequency spectrum of the signal in FIG. 9A.

FIGS. 9A and 9B illustrate the temporal waveform and frequency spectrum of the clock signal output from the clock signal generator 20. The frequency of the clock signal is 2 GHz, which is a null frequency of the coded transmitted signal on the first and the second channels. FIG. 9A shows the temporal waveform of the clock signal, with the horizontal axis representing time in nanoseconds and the vertical axis representing amplitude. FIG. 9B shows the frequency spectrum of the clock signal, with the horizontal axis representing frequency in hertz and the vertical axis representing intensity in decibels. As shown in FIG. 9A, the temporal waveform of the clock signal is sinusoidal with a period of 0.5 ns. As shown in FIG. 9B, the frequency spectrum of the clock signal indicates the presence of only a single frequency component at 2 GHz. Mathematically, the frequency spectrum of a signal having a sinusoidal temporal waveform is given by a δ function; in the simulation, it appears as a function having a sharp peak at 2 GHz and a very small uniform value elsewhere, as shown in FIG. 9B.

Figure 10A:
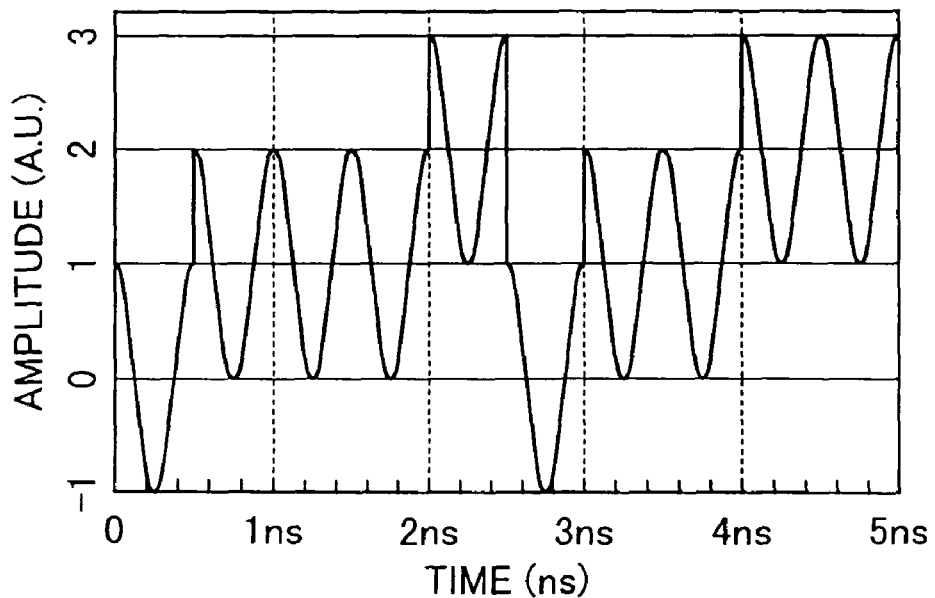
FIG. 10A shows an exemplary waveform of a CDM signal including a clock signal.
Figure 10B:
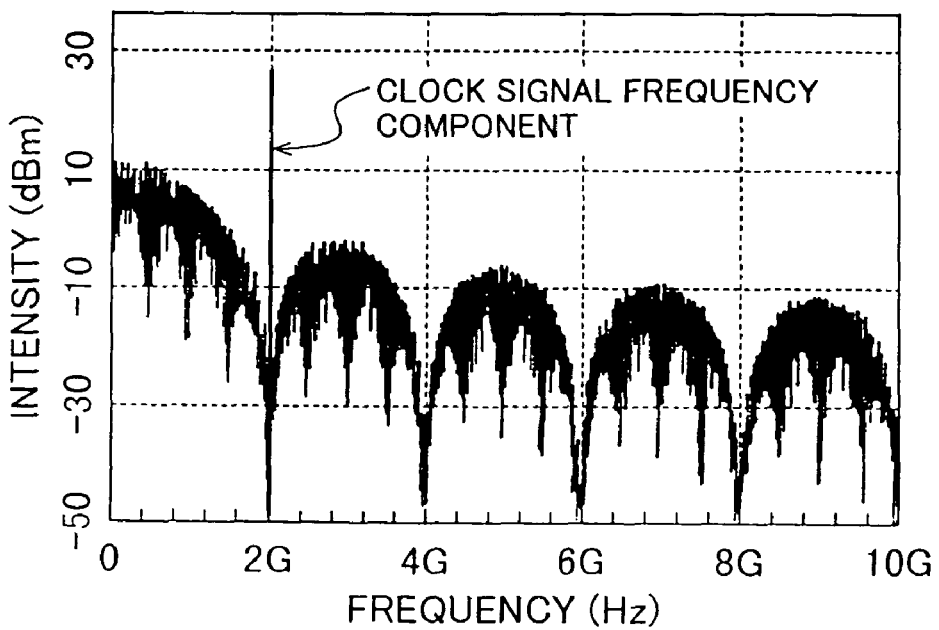
FIG. 10B shows the frequency spectrum of the signal in FIG. 10A.

FIGS. 10A and 10B illustrate the temporal waveform and frequency spectrum of a clocked CDM signal 17 generated by combining the CDM signal 15 and the clock signal at the clock signal combiner 16. FIG. 10A shows the temporal waveform of the clocked CDM signal 17, with the horizontal axis representing time in nanoseconds and the vertical axis representing amplitude. FIG. 10B shows the frequency spectrum of the clocked CDM signal 17, with the horizontal axis representing frequency in hertz and the vertical axis representing intensity in decibels. As shown in FIG. 10A, the clocked CDM signal 17 is a signal generated by combining a CDM signal having an NRZ format with a clock signal having a sinusoidal waveform, so its waveform is a generally smooth curve reflecting the sinusoidal waveform, with a rectangular envelope reflecting the CDM signal. As shown in FIG. 10B, the frequency spectrum of the clocked CDM signal 17 has a shape in which the frequency spectrum of the clock signal shown in FIG. 9B is superimposed on the frequency spectrum of the CDM signal 15 shown in FIG. 8B. Therefore, the frequency spectrum of the clocked CDM signal 17 has a sharp peak at 2 GHz representing the frequency component of the clock signal.

FIG. 11 is a graph showing the transmittance characteristic of the BEF 38, with the horizontal axis representing frequency in GHz and the vertical axis representing amplitude transmittance in arbitrary units (A.U.). As shown in FIG. 11, the BEF 38 blocks a small range of frequencies centered on the 2 GHz null frequency of the clocked CDM signal, and transmits other frequency components without attenuation.

Figure 12A:
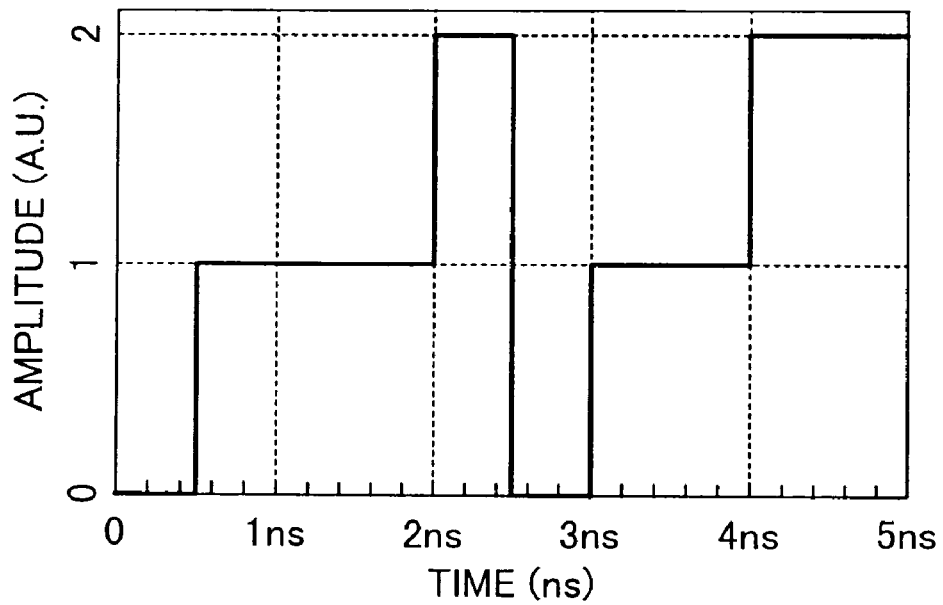
FIG. 12A shows an exemplary waveform of a coded received signal output from the BEF.
Figure 12B:
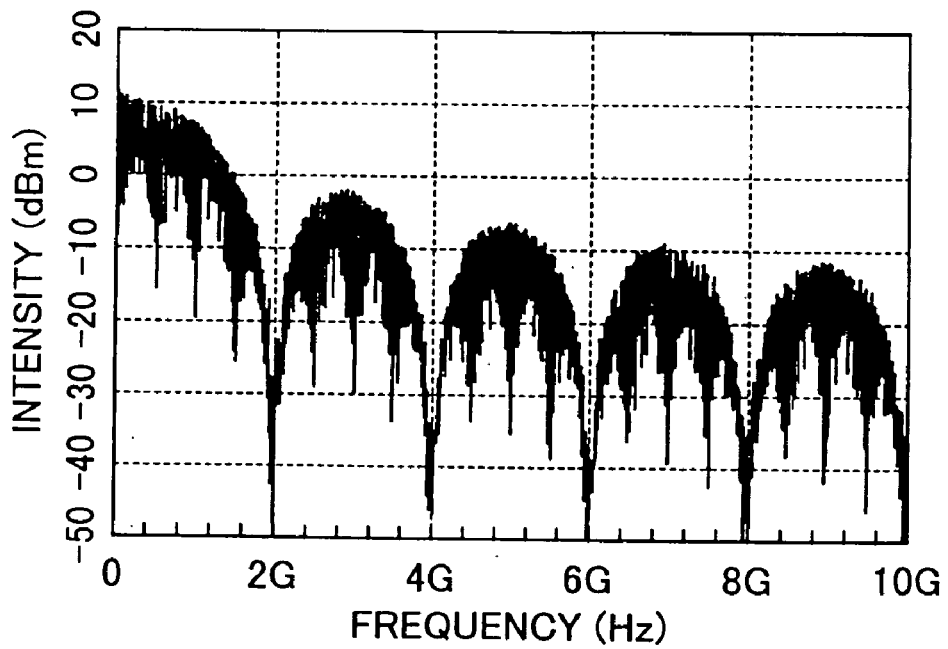
FIG. 12B shows the frequency spectrum of the signal in FIG. 12A.
Figure 13A:
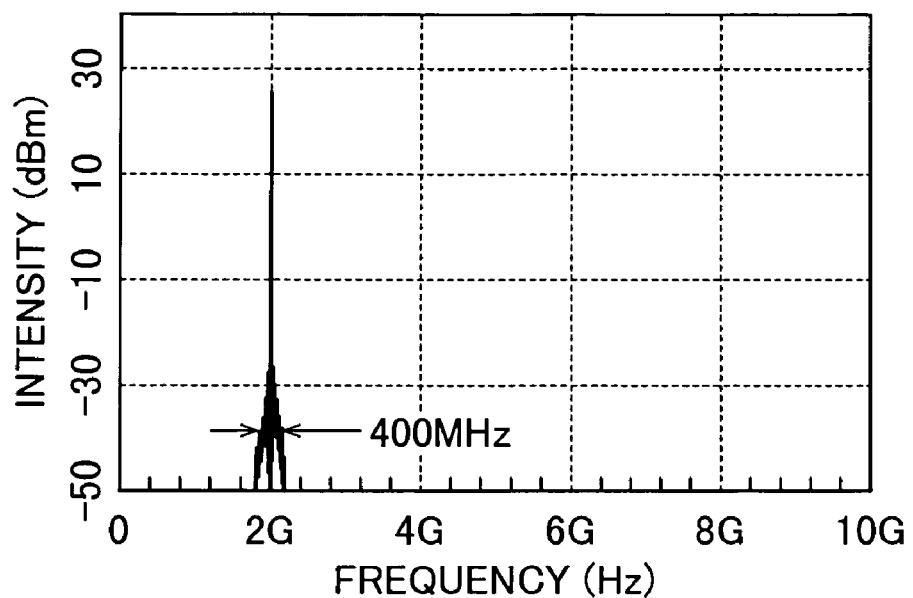
FIG. 13A shows the transmittance characteristic of a BPF with a passband width of four hundred megahertz (400 MHz)
Figure 13B:
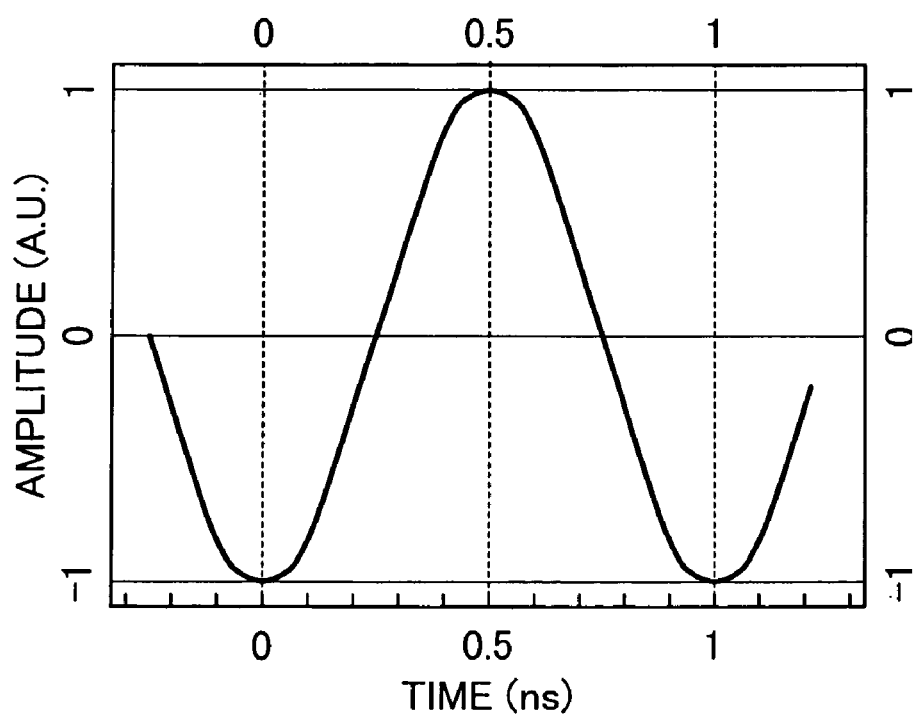
FIG. 13B shows an exemplary waveform of a clock signal recovered after passage through the BPF in FIG. 13A.
Figure 14A:
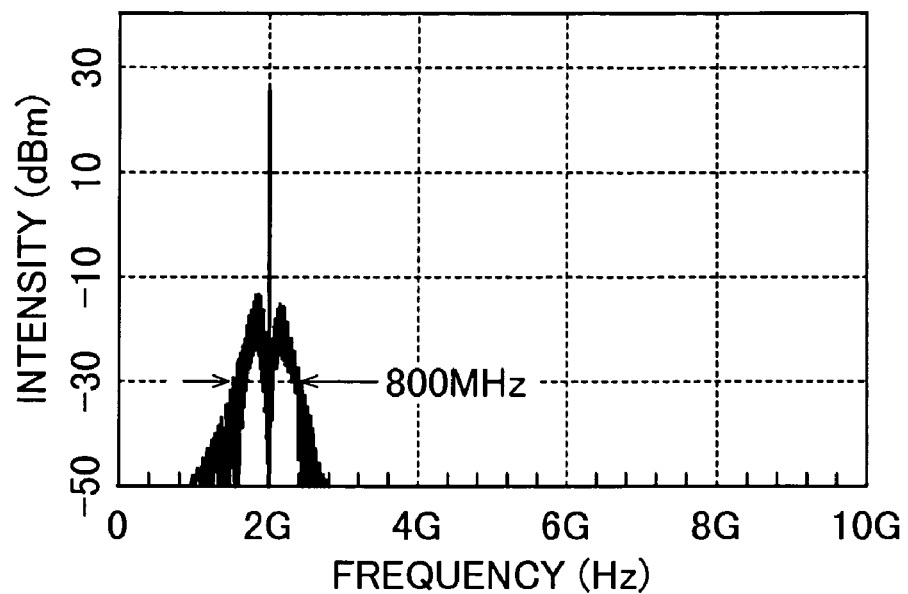
FIG. 14A shows the transmittance characteristic of a BPF with a passband width of 800 MHz.
Figure 14B:
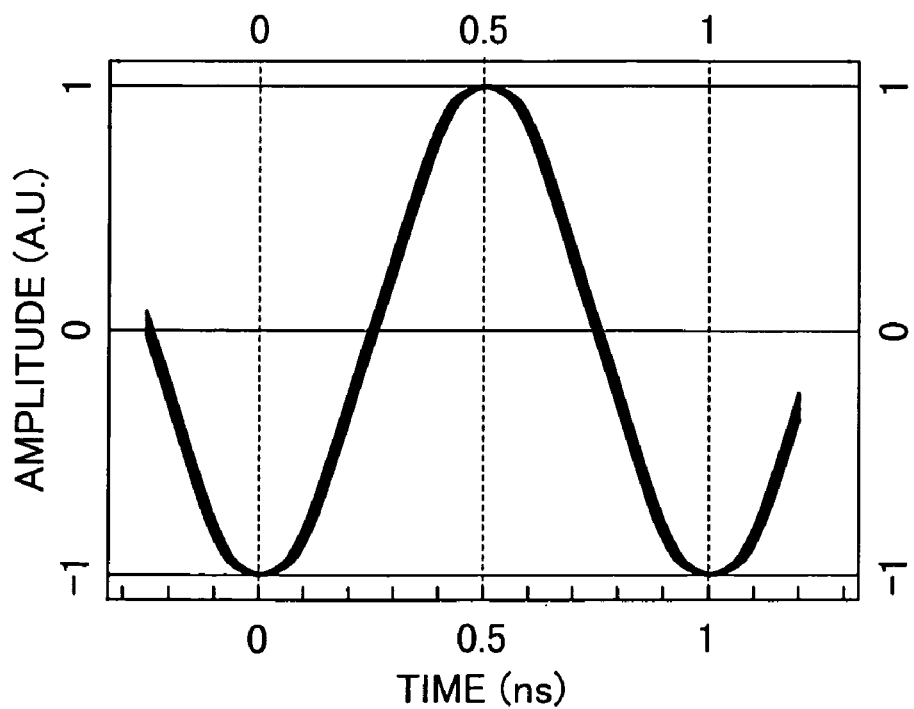
FIG. 14B shows an exemplary waveform of a clock signal recovered after passage through the BPF in FIG. 14A.
Figure 15A:
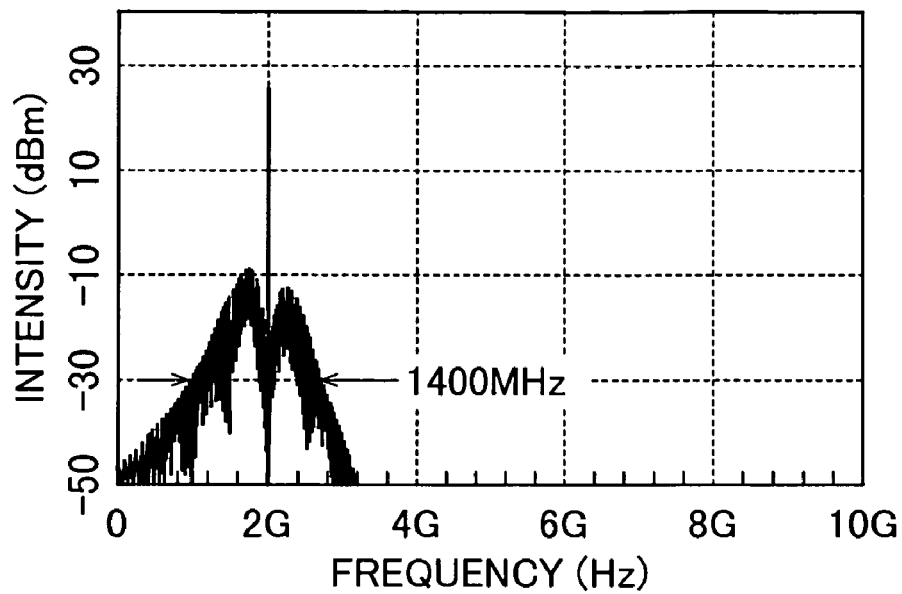
FIG. 15A shows the transmittance characteristic of a BPF with a passband width of 1600 MHz.
Figure 15B:
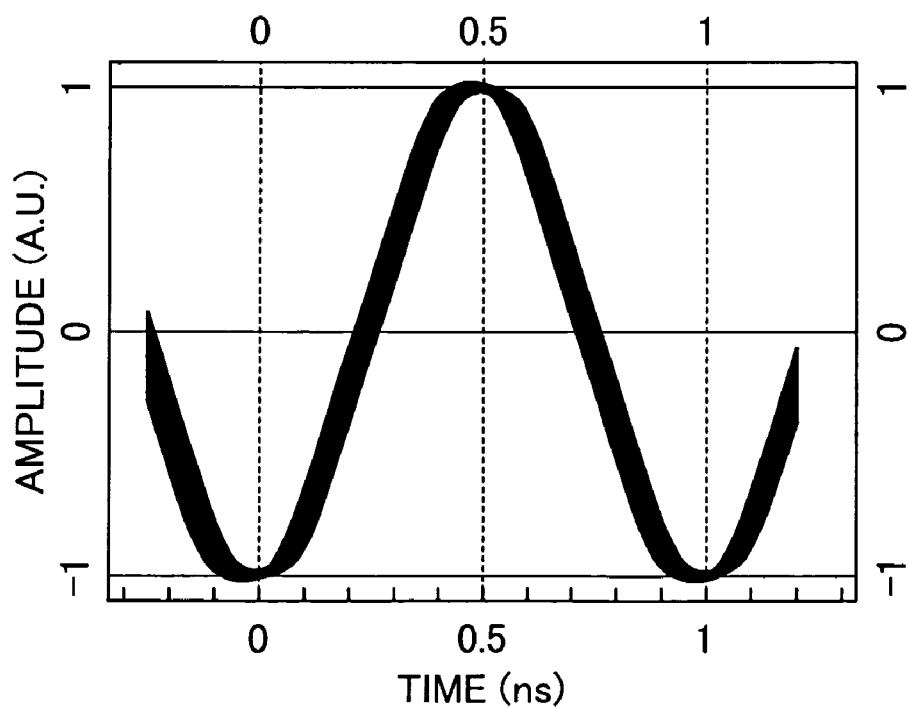
FIG. 15B an exemplary waveform of a clock signal recovered after passage through the BPF in FIG. 15A.
Figure 16A:
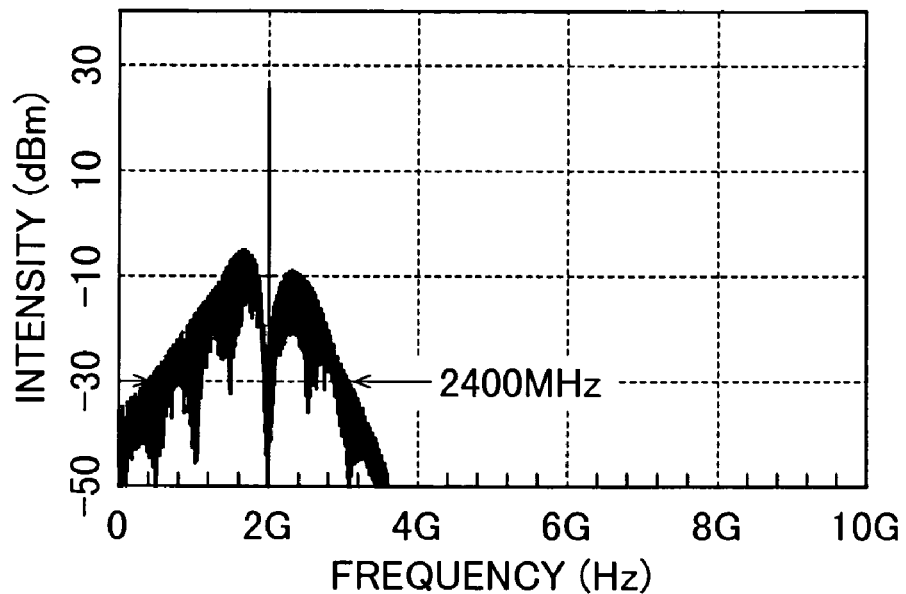
FIG. 16A shows the transmittance characteristic of a BPF with a passband width of 2400 MHz.
Figure 16B:
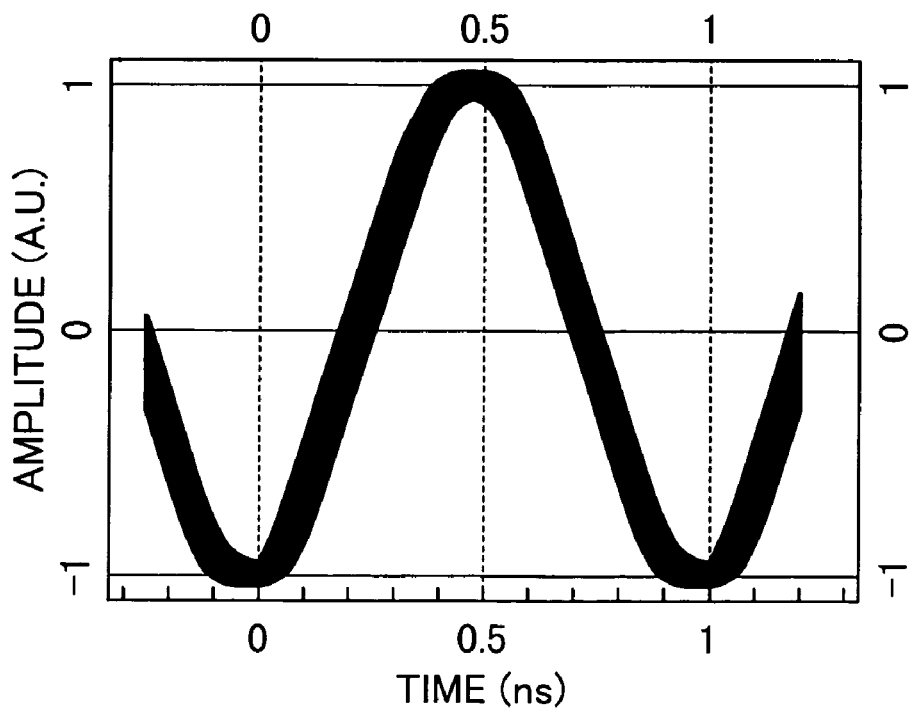
FIG. 16B shows an exemplary waveform of a clock signal recovered after passage through the BPF in FIG. 16A.

FIGS. 12A and 12B illustrate the temporal waveform and frequency spectrum of the coded received signal 39 output from the BEF 38. FIG. 12A shows the temporal waveform of the coded received signal 39, with the horizontal axis representing time in nanoseconds and the vertical axis representing amplitude. FIG. 12B shows the frequency spectrum of the coded received signal 39, with the horizontal axis representing frequency in hertz and the vertical axis representing intensity in decibels. As shown in FIG. 12A, since the coded received signal 39 is a CDM signal in the NRZ format generated by eliminating the frequency component of the sinusoidal clock signal from the clocked CDM signal 17, it is a three-valued digital signal having values of 0, 1, and 2, similar to the CDM signal 15. As shown in FIG. 12B, the null frequencies of the frequency spectrum of the coded received signal 39 are 2 GHz, 4 GHz, 6 GHz, 8 GHz, 10 GHz and so on, similar to the frequency spectrum of the CDM signal 15 shown in FIG. 8B.

Therefore, the temporal waveform of the coded received signal 39 is similar to that of the CDM signal 15 shown in FIG. 8A, and the form of the frequency spectrum of the coded received signal 39 shown in FIG. 12B is similar to that of the CDM signal 15 shown in FIG. 8B. Since the frequency spectrum of the coded received signal 39 shown in FIG. 12B lacks the clock frequency component that was present in the clocked CDM signal but was blocked by the BEF 38, it has no sharp peak at 2 GHz.

FIGS. 13A and 13B to FIGS. 16A and 16B illustrate the effect of the width of the passband of the BPF 40 on the temporal waveform of the clock signal output from the clock recovery device 46. FIGS. 13A, 14A, 15A, and 16A show the transmittance characteristic of the BPF 40 when the width of the passband of the BPF 40 is 400 MHz, 800 MHz, 1600 MHz, and 2400 MHz, respectively. In FIGS. 13A, 14A, 15A, and 16A, the horizontal axis represents frequency in hertz while the vertical axis represents transmitted intensity in decibels.

FIGS. 13B, 14B, 15B, and 16B show the temporal waveform of the clock signal output from the clock recovery device 46 when the width of the passband of the BPF 40 is 400 MHz, 800 MHz, 1600 MHz, and 2400 MHz, respectively. The waveforms shown are superimposed traces covering multiple periods of the clock signal. In FIGS. 13B, 14B, 15B, and 16B, the horizontal axis represents time in nanoseconds while the vertical axis represents amplitude.

A comparison of the temporal waveforms of the clock signals shown in FIGS. 13B, 14B, 15B, and 16B shows that the narrower the width of the passband of the BPF 40 is, the more stable the extracted clock signal is. In other words, the greater the width of the passband of the BPF 40 is, the more the waveform of the clock signal tends to jitter back and forth in time. The thickness of the superimposed traces indicates the degree of this jitter of the clock signal; that is, it represents the instability of the extracted clock signal.

Ideally, the passband of the BPF 40 should be narrow enough to stabilize the clock signal completely, but a BPF 40 with a very narrow passband at a high frequency is technically difficult to achieve and raises the manufacturing cost of the ONU. Therefore, the width of the passband of the BPF 40 should be determined in consideration of the width of the window in the gating processor 282 that uses the extracted clock signal.

The higher the bit rate of the bi-level digital transmit signal for one channel sent from the OLT 10 is, the narrower the window of the gating processor 282 is, and the width of the passband of the BPF 40 should be narrowed accordingly. The width of the passband of the BPF 40 should be chosen to reduce the jitter of the clock signal, corresponding to the thickness of the waveforms in FIGS. 13A, 14A, 15A, 16A, to a value that is negligible in comparison with the time period corresponding to one bit.

The length of the window in the gating processor 282 generally exceeds the time period corresponding to one frame, providing a margin of allowable clock jitter. In that case, it is sufficient for the clock jitter, that is, the thickness of the waveforms in FIGS. 13A, 14A, 15A, 16A, to be less than the difference between the window length in the gating processor 282 and the frame length. If this condition is satisfied, then the gating processor 282 can operate according to the recovered clock signal without blocking any part of each frame. Therefore, the width of the passband of the BPF 40 should be chosen to make the clock jitter satisfy this condition. Specifically, the width of the passband of the BPF 40 should not exceed the difference between the window length and the frame length.

When the bit rate of a bi-level digital transmit signal for one channel sent from the OLT 10 rises, the chip-rate frequency of the CDM signal rises accordingly. Thus, the width of the passband of the BPF 40 should be reduced as the chip-rate frequency of the CDM signal rises. Therefore, the width of the passband of the BPF 40 should be inversely proportional to the chip-rate frequency of the CDM signal.

Although the clock signal in the embodiment above has a frequency equal to the chip rate of the CDM signal, the invention is not limited to this clock frequency. The clock frequency may be any integer multiple of the chip rate; more generally, the clock frequency may be any null frequency in the frequency spectrum of the CDM signal.

Those skilled in the art will recognize that other variations are possible within the scope of the invention, which is defined in the appended claims.

What is claimed is:

1. A code division multiplex signal receiving apparatus for use in a code division multiplex transmitting and receiving system, for receiving a clocked code division multiplex signal generated by combining a code division multiplex signal with a clock signal having a frequency equal to a null frequency disposed in a void in a frequency spectrum of the code division multiplex signal, comprising:
   a bandpass filter that extracts a first frequency component of the clocked code division multiplex signal, the first frequency component including the frequency of the clock signal;
   a clock recovery device that recovers the clock signal from the first frequency component;
   a band elimination filter that eliminates a second frequency component including the frequency of the clock signal from the clocked code division multiplex signal to obtain a received code division multiplex signal;
   a received signal processor that processes the received code division multiplex signal in synchronization with the clock signal recovered by the clock recovery device; wherein
   the code division multiplex signal is organized into frames having a first length, and the received signal processor includes a gating unit operable in synchronization with the recovered clock signal to open and close a window having a second length greater than the first length and to pass the received code division multiplex signal only while the window is open, and
   the bandpass filter has a passband width substantially equal to a reciprocal of a difference between the first length and the second length.

2. The code division multiplex signal receiving apparatus of claim 1, wherein said null frequency is a chip-rate frequency of the code division multiplex signal.

3. A code division multiplex transmitting and receiving system, comprising:
   a code division multiplexed transmitting apparatus including:
      a code division multiplex signal transmitting section for encoding transmit signals on a plurality of channels to generate respective coded transmit signals, and multiplexing the coded transmit signals to generate a code division multiplex signal,
      a clock signal generator for generating and outputting a clock signal having a frequency equal to a null frequency disposed in a void in a frequency spectrum of the code division multiplex signal, and
      a clock signal combiner for combining the code division multiplex signal and the clock signal to generate a clocked code division multiplex signal and transmitting the clocked code division multiplex signal to the code division multiplex signal receiving apparatus; and
   a code division multiplex signal receiving apparatus including:
      a code division multiplex signal splitter for receiving the clocked code division multiplex signal and splitting the clocked code division multiplex signal into a first clocked code division multiplex signal and a second clocked code division multiplex signal,
      band elimination filter for receiving the first clocked code division multiplex signal and eliminating a first frequency component including the frequency of the clock signal to obtain a coded received signal,
      a received signal processor for receiving the coded received signal, decoding the coded received signal, recovering the received signal, and outputting the received signal, the received signal processor including
         a decoding unit for decoding the coded received signal and outputting the decoded received signal,
         a gating processor for gating the decoded received signal, and
         a header remover for eliminating a header of the decoded received signal output from the gating processor and outputting the received signal;
      a bandpass filter for receiving the second clocked code division multiplex signal, extracting a second frequency component including the frequency of the clock signal from the second clocked code division multiplex signal, and outputting the second frequency component; and
      a clock recovery device for recovering the clock signal from the second frequency component; wherein
      the code division multiplex signal is organized into frames having a first length, and the gating processor operates in synchronization with the recovered clock signal to open and close a window having a second length greater than the first length and to pass the received code division multiplex signal only while the window is open, and
      the bandpass filter has a passband width substantially equal to a reciprocal of a difference between the first length and the second length.

4. The code division multiplex transmitting and receiving system of claim 3, wherein said null frequency is a chip-rate frequency of the code division multiplex signal.

5. The code division multiplex transmitting and receiving system of claim 3, wherein the code division multiplex signal transmitting section comprises:
   first to N-th transmit signal processing units for generating and outputting coded transmit signals for first to N-th channels, where N is an integer greater than one; and
   a coded signal combiner for combining the coded transmit signals output from the first to the N-th transmit signal processing units.

6. The code division multiplex transmitting and receiving system of claim 5, wherein each of the first to the N-th transmit signal processing units comprises:
   a header attachment unit for generating a transmit signal by adding a header to a bi-level digital transmit signal and outputting the bi-level digital transmit signal with the header;
   a coding unit for receiving and encoding the bi-level digital transmit signal with the header and outputting a resulting coded transmit signal; and
   a transmit timing adjustment unit for receiving the coded transmit signal and adjusting a transmitting timing thereof.

7. The code division multiplex transmitting and receiving system of claim 3, further comprising a passive optical network through which the code division multiplex signal transmitting apparatus and code division multiplex signal receiving apparatus are interconnected.

* * * * *